(12) United States Patent
Watanabe et al.

(10) Patent No.: US 11,916,438 B2
(45) Date of Patent: Feb. 27, 2024

(54) MAGNETIZATION RING, MAGNETIZATION METHOD, MAGNETIZATION APPARATUS, ROTOR, MOTOR, COMPRESSOR, AND AIR CONDITIONER

(71) Applicant: Mitsubishi Electric Corporation, Tokyo (JP)

(72) Inventors: Takanori Watanabe, Tokyo (JP); Atsushi Matsuoka, Tokyo (JP); Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 333 days.

(21) Appl. No.: 17/607,691

(22) PCT Filed: Jun. 4, 2019

(86) PCT No.: PCT/JP2019/022142
§ 371 (c)(1),
(2) Date: Oct. 29, 2021

(87) PCT Pub. No.: WO2020/245903
PCT Pub. Date: Dec. 10, 2020

(65) Prior Publication Data
US 2022/0216752 A1    Jul. 7, 2022

(51) Int. Cl.
*H02K 1/276* (2022.01)
*H02K 15/03* (2006.01)
*H02K 21/14* (2006.01)

(52) U.S. Cl.
CPC ........... *H02K 1/2766* (2013.01); *H02K 15/03* (2013.01); *H02K 21/14* (2013.01)

(58) Field of Classification Search
CPC ...... H02K 1/276; H02K 1/2766; H02K 15/03; H02K 21/14; H02K 2213/03
See application file for complete search history.

(56) References Cited

U.S. PATENT DOCUMENTS

| | | | | |
|---|---|---|---|---|
| 5,780,944 | A | * | 7/1998 | Sakamoto .............. H02K 37/12 310/179 |
| 6,043,574 | A | * | 3/2000 | Prudham ................ H02K 37/14 310/156.64 |

(Continued)

FOREIGN PATENT DOCUMENTS

| | | |
|---|---|---|
| JP | 2009-171764 A | 7/2009 |
| JP | 2015-139248 A | 7/2015 |
| JP | 2015-180145 A | 10/2015 |

OTHER PUBLICATIONS

International Search Report of the International Searching Authority dated Sep. 10, 2019 for the corresponding International application No. PCT/JP2019/022142 (and English translation).

*Primary Examiner* — Jue Zhang
(74) *Attorney, Agent, or Firm* — POSZ LAW GROUP, PLC

(57) ABSTRACT

A magnetization ring is disposed between a rotor and a core portion surrounding the rotor, the rotor having permanent magnets and inter-pole portions which are arranged in a circumferential direction about an axis. The magnetization ring has a magnetic portion facing the center of the permanent magnet in the circumferential direction, and a nonmagnetic portion facing the inter-pole portion of the rotor.

38 Claims, 27 Drawing Sheets

(56) References Cited

U.S. PATENT DOCUMENTS

| | | | |
|---|---|---|---|
| 7,164,215 B2* | 1/2007 | Mizumaki | H02K 5/1672 |
| | | | 310/49.32 |
| 2015/0206642 A1 | 7/2015 | Nimura et al. | |
| 2017/0170696 A1* | 6/2017 | Ogawa | H02K 1/2773 |
| 2018/0062461 A1* | 3/2018 | Gieras | H02K 15/03 |

* cited by examiner

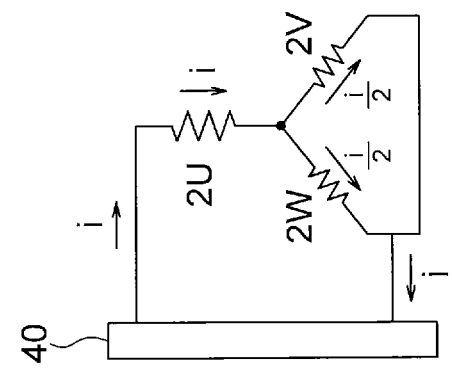
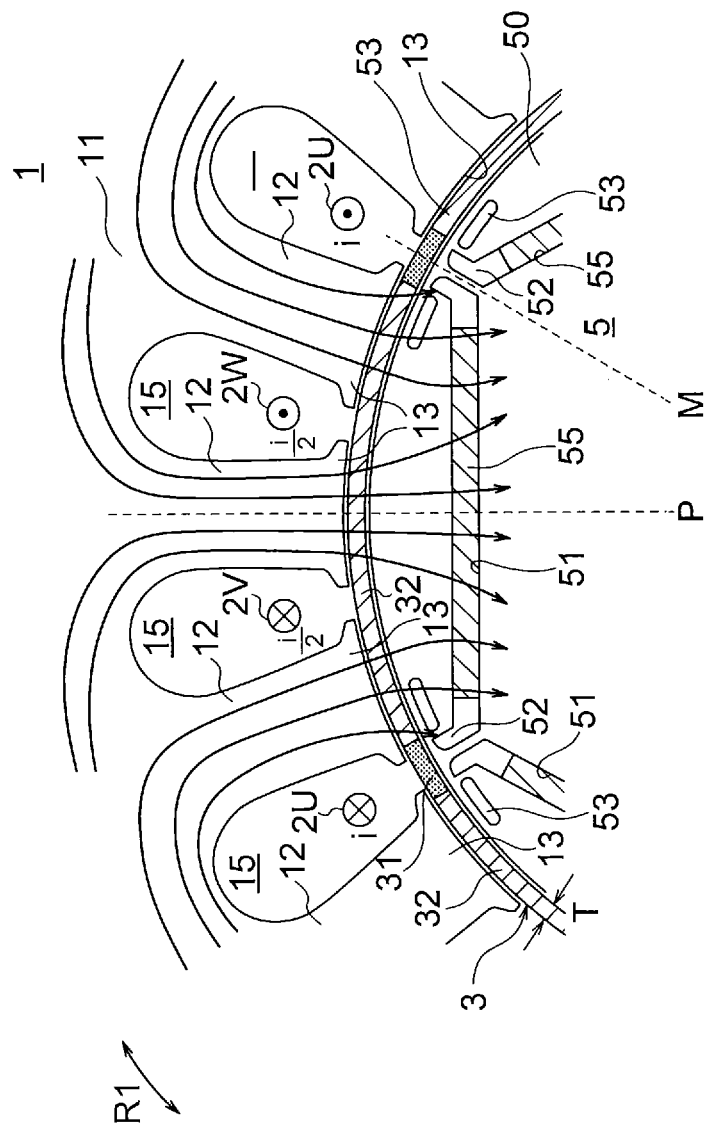

MAGNETIZATION RING, MAGNETIZATION METHOD, MAGNETIZATION APPARATUS, ROTOR, MOTOR, COMPRESSOR, AND AIR CONDITIONER

CROSS REFERENCE TO RELATED APPLICATION

This application is a U.S. national stage application of International Application No. PCT/JP2019/022142, filed on Jun. 4, 2019, the contents of which are incorporated herein by reference.

TECHNICAL FIELD

The present invention relates to a magnetization ring, a magnetization method, a magnetization apparatus, a rotor, a motor, a compressor, and an air conditioner.

BACKGROUND

In a permanent magnet embedded type motor, a permanent magnet is magnetized in such a manner that a rotor to which the permanent magnet is attached is incorporated in a stator or a magnetization yoke. In order to efficiently magnetize the permanent magnet, it is proposed to insert a strip having magnetism, between the stator and the rotor (see, for example, Patent Reference 1).

PATENT REFERENCE

[Patent Reference 1] Japanese Patent Application Publication No. 2015-180145 (paragraphs 0033-0034)

However, a gap between the stator and the rotor is as narrow as 0.25 to 1.5 mm, and thus it is not easy to insert the strip into the gap. For this reason, it is desired to enable efficient magnetization of a permanent magnet with a simple operation.

SUMMARY

The present invention is intended to solve the above-described problem, and an object of the present invention is to enable efficient magnetization of a permanent magnet with a simple operation.

A magnetization ring according to an aspect of the present invention is disposed between a rotor and a core portion surrounding the rotor. The rotor has a permanent magnet and an inter-pole portion which are arranged in a circumferential direction about an axis. The magnetization ring has a magnetic portion facing a center of the permanent magnet in the circumferential direction, a nonmagnetic portion facing the inter-pole portion, and a nonmagnetic annular portion on at least one side of the magnetic portion and the nonmagnetic portion in a direction of the axis.

A magnetization method according to another aspect of the present invention includes disposing a magnetization ring between a rotor and a core portion surrounding the rotor, the rotor having a permanent magnet and an inter-pole portion which are arranged in a circumferential direction about an axis, and magnetizing the permanent magnet by applying current to a coil wound on the core portion. The magnetization ring has a magnetic portion facing a center of the permanent magnet in the circumferential direction, a nonmagnetic portion facing the inter-pole portion, and a nonmagnetic annular portion on at least one side of the magnetic portion and the nonmagnetic portion in a direction of the axis.

A magnetization apparatus according to still another aspect of the present invention is to magnetize a permanent magnet of a rotor having the permanent magnet and an inter-pole portion which are arranged in a circumferential direction about an axis. The magnetization apparatus includes a magnetization yoke on which a coil is wound and which surrounds the rotor, a magnetization ring disposed between the magnetization yoke and the rotor, and a power source to apply current to the coil. The magnetization ring has a magnetic portion facing a center of the permanent magnet in the circumferential direction, a nonmagnetic portion facing the inter-pole portion, and a nonmagnetic annular portion on at least one side of the magnetic portion and the nonmagnetic portion in a direction of the axis.

A rotor according to yet another aspect of the present invention has a permanent magnet and an inter-pole portion which are arranged in a circumferential direction about an axis. The rotor is magnetized by the above described magnetization method.

In the present invention, the magnetic portion of the magnetization ring faces the center of the permanent magnet in the circumferential direction, and thus magnetization magnetic flux from the core portion can efficiently flow to the permanent magnet. Moreover, since the nonmagnetic portion of the magnetization ring faces the inter-pole portion, short-circuit of the magnetization magnetic flux can be suppressed. Further, the magnetic portion and the nonmagnetic portion constitute the magnetization ring, the magnetization ring can be easily handled. That is, the permanent magnet can be efficiently magnetized with a simple operation.

BRIEF DESCRIPTION OF DRAWINGS

FIG. 9(A) is a diagram illustrating the magnetization process according to the first embodiment, and FIG. 9(B) is a diagram illustrating magnetization current flowing through coils.

DETAILED DESCRIPTION

Embodiments of the present invention will be described in detail below with reference to the figures. The present invention is not limited to these embodiments.

First Embodiment

Figure 1:
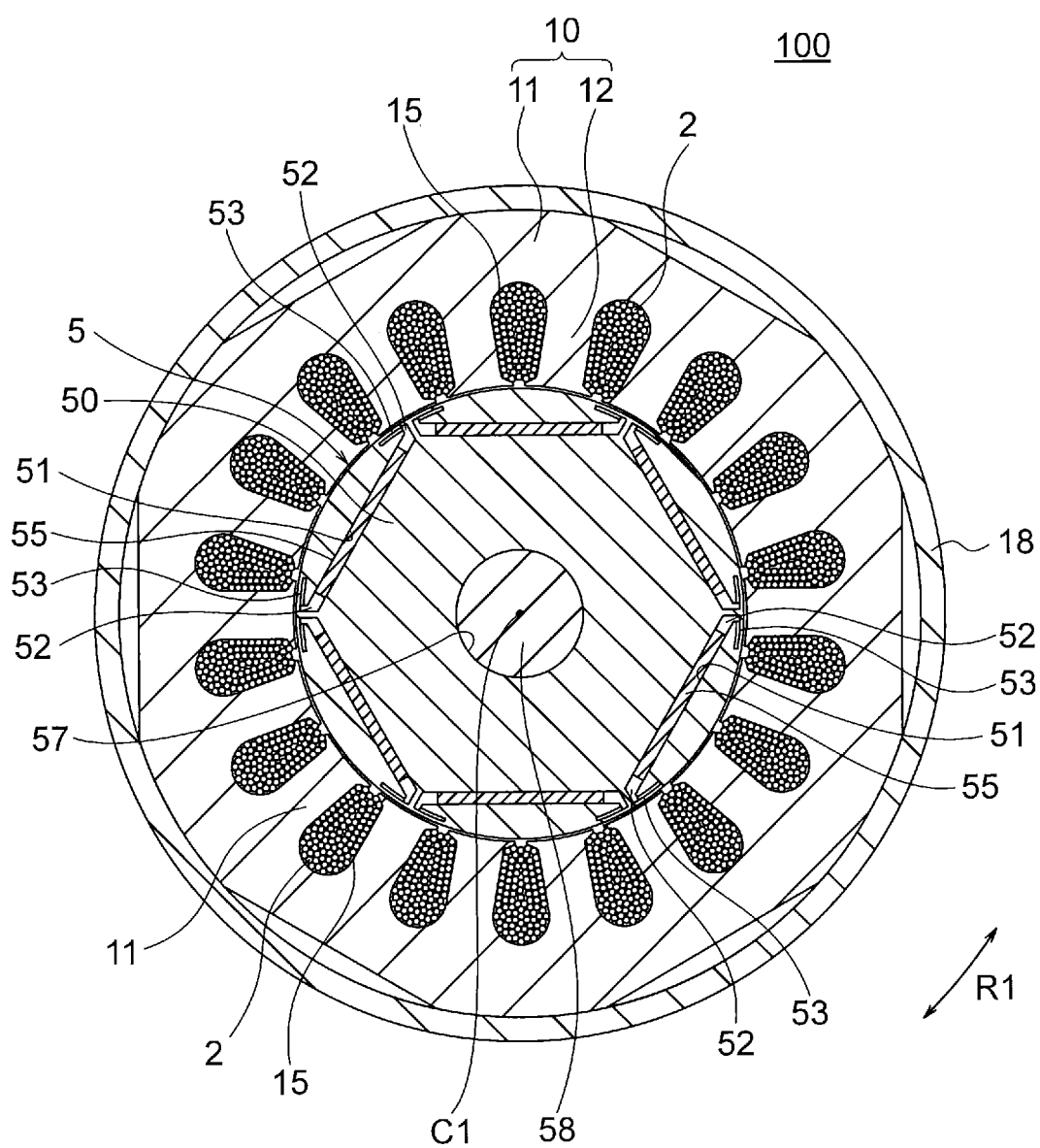
FIG. 1 is a sectional view illustrating a motor according to a first embodiment.

FIG. 1 is a sectional view illustrating a motor 100 according to a first embodiment. The motor 100 of the first embodiment includes a rotatable rotor 5 and a stator 1 that surrounds the rotor 5. An air gap of 0.25 to 1 mm is provided between the stator 1 and the rotor 5.

Hereinafter, a direction of an axis C1, which is a rotating axis of the rotor 5, is referred to as an "axial direction". A circumferential direction about the axis C1 is referred to as a "circumferential direction" and indicated by an arrow R1 in FIG. 1 and other figures. A radial direction about the axis C1 is referred to as a "radial direction". FIG. 1 illustrates a cross-section in a plane perpendicular to the axial direction.

The rotor 5 includes a rotor core 50 and permanent magnets 55 attached to the rotor core 50. The rotor core 50 has a cylindrical shape about the axis C1. The rotor core 50 is made of electromagnetic steel sheets which are stacked in the axial direction and fastened by crimping or the like. The sheet thickness of each electromagnetic steel sheet is, for example, 0.1 to 0.7 mm.

The rotor core 50 has a plurality of magnet insertion holes 51 along its outer circumference. In this example, six magnet insertion holes 51 are disposed at equal intervals in the circumferential direction. One permanent magnet 55 is disposed in each magnet insertion hole 51. One permanent magnet 55 constitutes one magnetic pole. The number of permanent magnets 55 is six, which is the same as the number of magnet insertion holes 51, and thus the number of poles of the rotor 5 is six. The number of poles of the rotor 5 is not limited to six, but only needs to be two or more. Two or more permanent magnets 55 may be disposed in one magnet insertion hole 51 so that the two or more permanent magnets 55 constitute one magnetic pole.

The permanent magnet 55 is a member in the form of a flat plate, and has a width in the circumferential direction and a thickness in the radial direction. The permanent magnet 55 is made of a rare earth magnet that contains neodymium (Nd), iron (Fe) and boron (B). The permanent magnet 55 is magnetized in its thickness direction, i.e., in the radial direction. The permanent magnets 55 adjacent to each other in the circumferential direction are magnetized in opposite directions.

As described above, the permanent magnet 55 constitutes the magnetic pole of the rotor 5. A center of the permanent magnet 55 in the circumferential direction forms a pole center P (FIG. 3) of the rotor 5. An inter-pole portion M (FIG. 3) of the rotor 5 is formed between the permanent magnets 55 adjacent to each other in the circumferential direction.

A circular shaft hole 57 is formed at a center of the rotor core 50 in the radial direction. A shaft 58 is fixed into the shaft hole 57 by press-fitting. A center axis of the shaft 58 coincides with the axis C1 described above.

A flux barrier 52 is formed on each of both ends of the magnet insertion hole 51 in the circumferential direction. The flux barrier 52 is an opening extending in the radial direction from the end of the magnet insertion hole 51 in the circumferential direction toward the outer circumference of the rotor core 50. The flux barrier 52 is provided to suppress leakage magnetic flux between the adjacent magnetic poles.

The stator 1 includes a stator core 10 and coils 2 wound on the stator core 10. The stator core 10 is formed in an annular shape about the axis C1. The stator core 10 is made of a plurality of electromagnetic steel sheets which are stacked in the axial direction and fastened by crimping or the like. The thickness of each electromagnetic steel sheet is, for example, 0.1 to 0.7 mm.

The stator core 10 includes an annular core back 11 and a plurality of teeth 12 extending inward in the radial direction from the core back 11. The core back 11 is formed in an annular shape about the axis C1, and is fitted inside a cylindrical frame 18.

The teeth 12 are formed at equal intervals in the circumferential direction. A slot 15 is formed between each adjacent two of the teeth 12. The coils 2 are wound around the teeth 12. The number of teeth 12 is 18 in this example, but only needs to be two or more.

The coil 2 is made of a conductor such as aluminum and an insulating film covering the conductor. The coils 2 are wound around the teeth 12 in distributed winding as illustrated in FIG. 1, but the coils 2 may be wound in concentrated winding.

Figure 2:
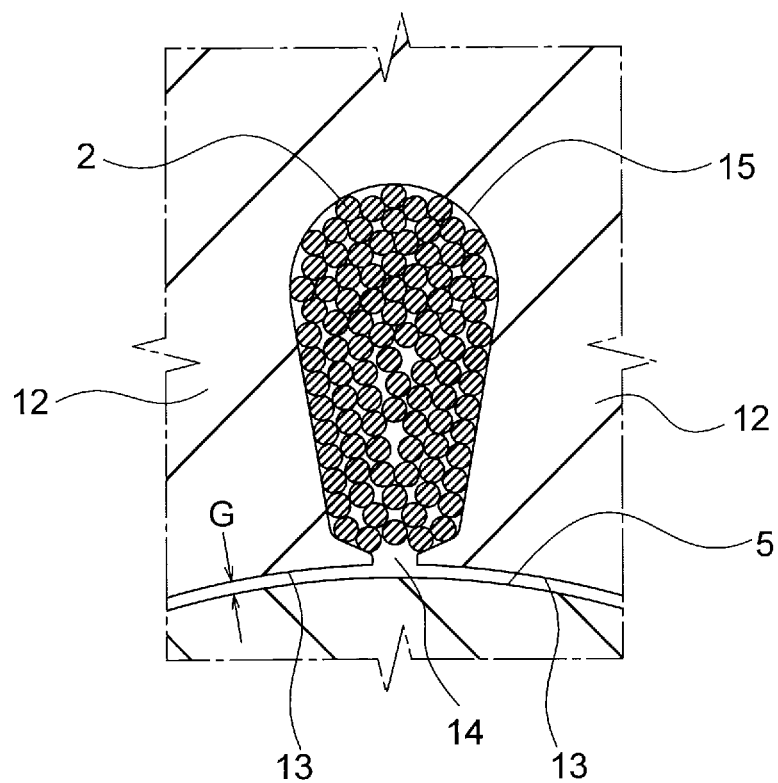
FIG. 2 is an enlarged diagram illustrating teeth and a slot of a stator according to the first embodiment.

FIG. 2 is an enlarged diagram illustrating the teeth 12 and the slot 15. A tip portion 13, which is wide in the circumferential direction, is formed at a tip of each tooth 12 on the inner side in the radial direction. The tip portion 13 faces an outer circumferential surface of the rotor 5.

The slot 15 is formed between adjacent two teeth 12. The number of slots 15 is the same as the number of teeth 12 (18 in this example). The coil 2 wound around the tooth 12 is housed in the slot 15. A slot opening 14 is formed at an end of the slot 15 on the inner side in the radial direction. The slot opening 14 is located between the tip portions 13 of the adjacent two teeth 12.

(Magnetization of Permanent Magnet)

Next, a configuration for magnetization of the permanent magnets 55 and a magnetization method will be described. The permanent magnets 55 are magnetized in a state where the permanent magnets 55 are inserted into the magnet insertion holes 51 of the rotor core 50. There are roughly two types of magnetization method for the permanent magnets 55.

One method is to use the stator 1. In this case, the rotor 5 is incorporated in the stator 1 as a core portion, and magnetization current is applied to the coils 2 to generate a magnetizing magnetic field, which magnetizes the permanent magnets 55 of the rotor 5. This magnetization method is also referred to as a post-assembly magnetization.

Another method is to use a magnetization yoke 80 (FIG. 24) of a magnetization apparatus 8. In this case, the rotor 5 is incorporated in a magnetization yoke 80 as the core portion, and the magnetization current is applied to coils 9 (FIG. 24) wound on the magnetization yoke 80 to thereby generate the magnetizing magnetic field. The magnetization method using the magnetization yoke 80 will be described in a sixth embodiment.

Figure 3:
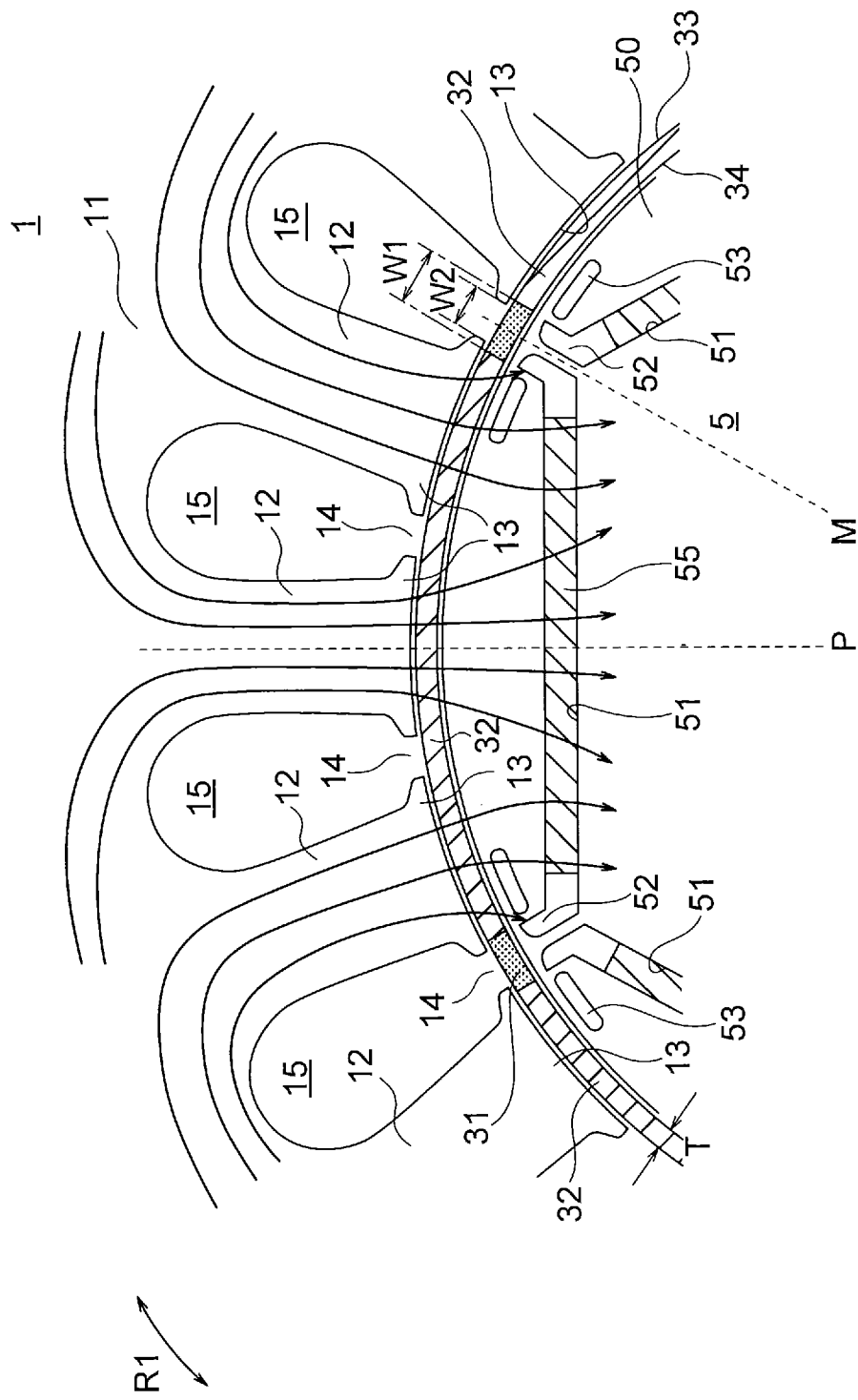
FIG. 3 is a diagram illustrating a magnetization ring, the stator, and a rotor according to the first embodiment.

Hereinafter, a description will be made of the method of magnetizing the permanent magnets 55 in a state where the rotor 5 is incorporated in the stator 1. FIG. 3 is a schematic diagram illustrating a magnetization ring 3, the stator 1, and the rotor 5 according to the first embodiment. The magnetization of the permanent magnets 55 is performed in a state where the inter-pole portions M of the rotor 5 face the slot openings 14 of the stator 1. The magnetization ring 3 is inserted between the stator 1 and the rotor 5.

Figure 4:
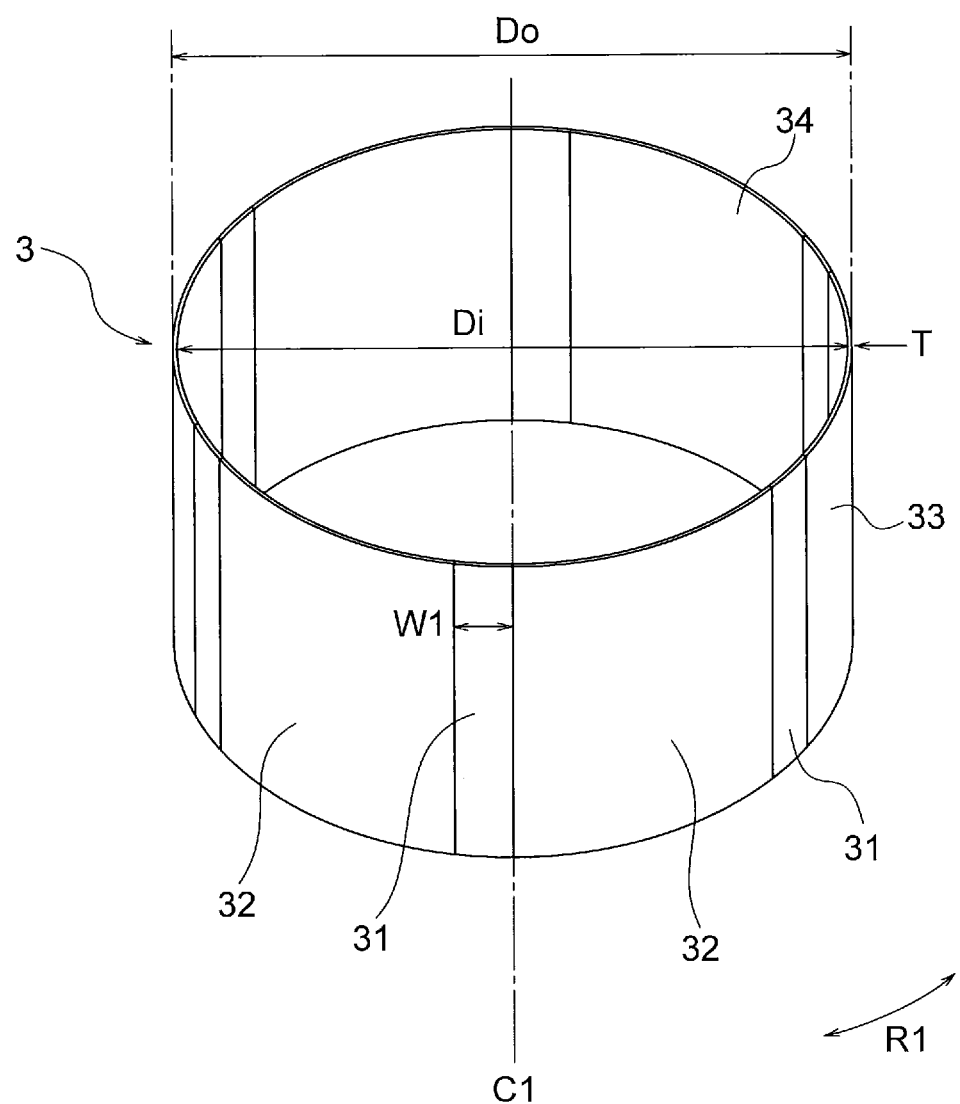
FIG. 4 is a perspective view illustrating the magnetization ring according to the first embodiment.

FIG. 4 is a perspective view illustrating the magnetization ring 3. The magnetization ring 3 is a cylindrical member that has an outer circumferential surface 33 facing the stator 1 and an inner circumferential surface 34 facing the rotor 5.

The magnetization ring 3 has an outer diameter Do and an inner diameter Di, and also has a thickness T. The inner diameter Di of the magnetization ring 3 is larger than an outer diameter Dr (FIG. 6(A)) of the rotor 5 (Di>Dr). The outer diameter Do of the magnetization ring 3 is smaller than an inner diameter Ds (FIG. 6(C)) of the stator 1 (Ds>Do). The thickness T of the magnetization ring 3 is smaller than or equal to the gap G between the rotor 5 and the stator 1 (G≥T>0).

The magnetization ring 3 includes a nonmagnetic portion 31 composed of a nonmagnetic body and a magnetic portion 32 composed of a magnetic body. The nonmagnetic portion 31 is desirably composed of a resin such as polyimide, but it may also be composed of a nonmagnetic metal such as stainless steel. The magnetic portion 32 is composed of a metal having magnetism such as an electromagnetic steel sheet or pure iron.

In the magnetization ring 3, a plurality of nonmagnetic portions 31 and a plurality of magnetic portions 32 are alternately arranged in the circumferential direction. The number of nonmagnetic portions 31 and the number of magnetic portions 32 are both the same as the number of poles of the rotor 5, which is six in this example.

The nonmagnetic portion 31 has a width W1 in the circumferential direction. The width W1 of the nonmagnetic portion 31 is constant along the axial direction. A width of the magnetic portion 32 in the circumferential direction is preferably wider than the width W1 of the nonmagnetic portion 31 in the circumferential direction.

As illustrated in FIG. 3, the magnetization ring 3 is disposed in such a manner that the nonmagnetic portions 31 face the inter-pole portions M of the rotor 5 while the magnetic portions 32 face the pole centers P of the rotor 5. The width W1 of the nonmagnetic portion 31 in the circumferential direction is wider than a width W2 of the slot opening 14 of the stator 1 in the circumferential direction. In other words, W1>W2 is satisfied.

Figure 5:
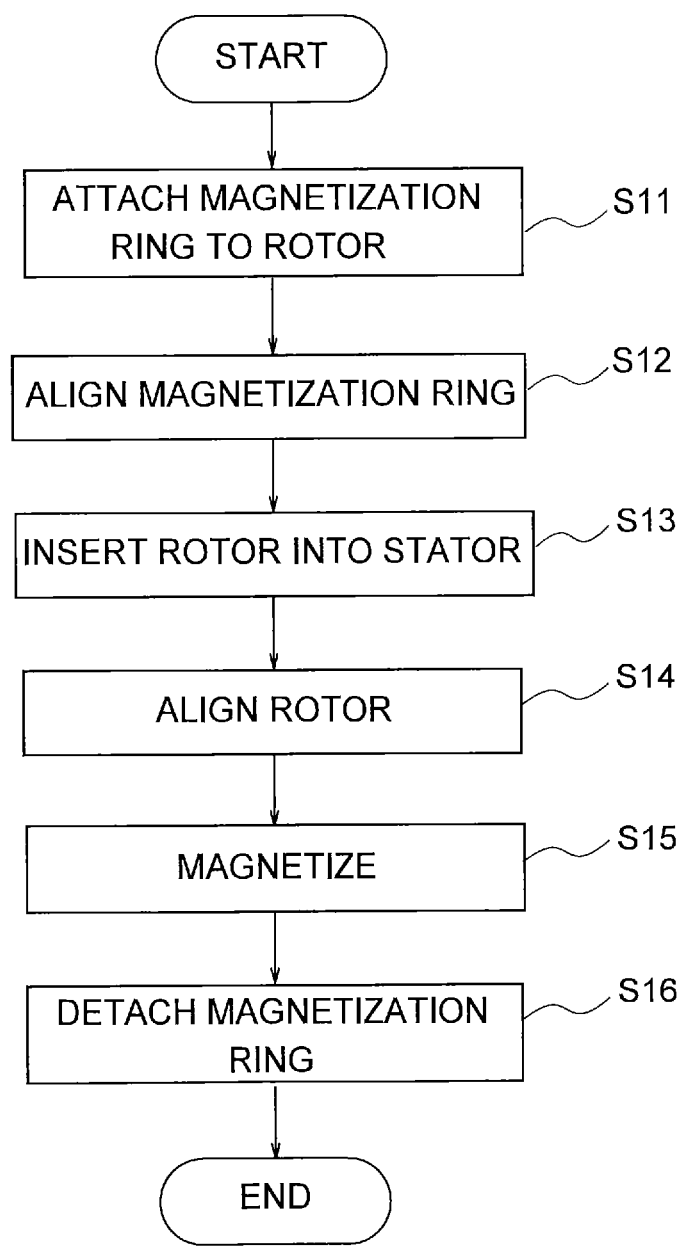
FIG. 5 is a flowchart illustrating a magnetization process according to the first embodiment.

FIG. 5 is a flowchart illustrating a magnetization process according to the first embodiment. FIGS. 6(A) to 6(C) and FIGS. 7(A) and 7(B) are perspective views illustrating steps of the magnetization process. FIG. 8 is a diagram illustrating an apparatus used in the magnetization process.

Figure 6A:
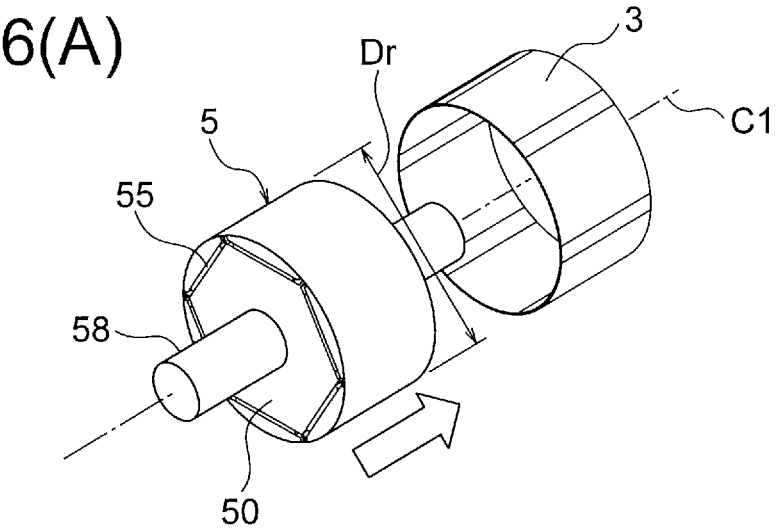
FIGS. 6(A), 6(B), and 6(C) are perspective views illustrating steps of the magnetization process according to the first embodiment.
Figure 7A:
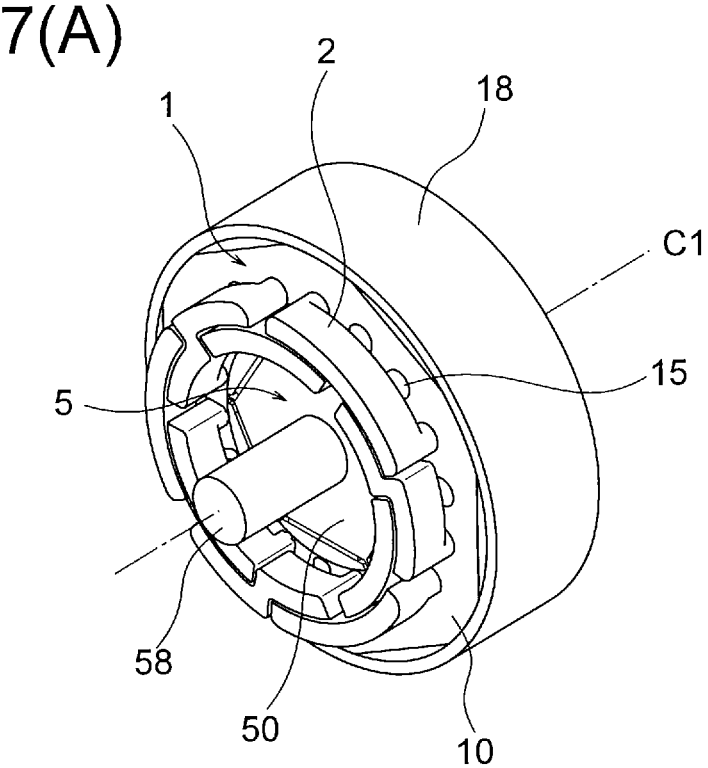
FIGS. 7(A) and 7(B) are perspective views illustrating steps of the magnetization process according to the first embodiment.

In the magnetization process, as illustrated in FIG. 6(A), first, the magnetization ring 3 is attached to the rotor 5 by inserting the rotor 5 into the inside of the magnetization ring 3 (step S11). Since the magnetization ring 3 is cylindrical and the inner diameter Di of the magnetization ring 3 is larger than the outer diameter Dr of the rotor 5 (Di>Dr), this attachment can be carried out easily.

It is also possible to put the magnetization ring 3 on the outer side of the rotor 5 while expanding the magnetization ring 3 in the radial direction utilizing elastic deformation of the nonmagnetic portions 31. In this case, the inner diameter Di of the magnetization ring 3 may be smaller than or equal to the outer diameter Dr of the rotor 5 (Di≤Dr).

Figure 6B:
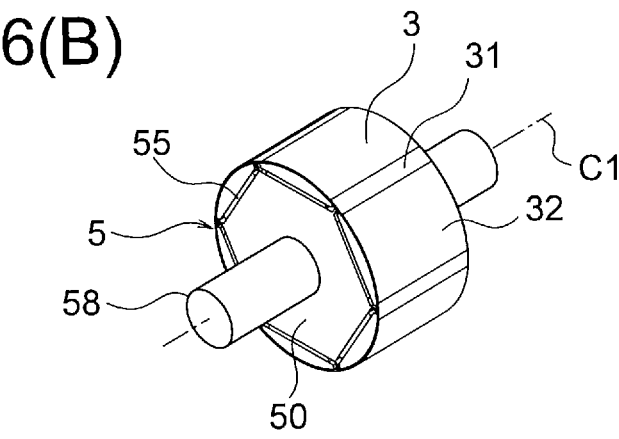

Then, as illustrated in FIG. 6(B), the magnetization ring 3 is aligned with respect to the rotor 5 in the circumferential direction so that the nonmagnetic portions 31 of the magnetization ring 3 face the inter-pole portions M of the rotor 5 (step S12).

Figure 6C:
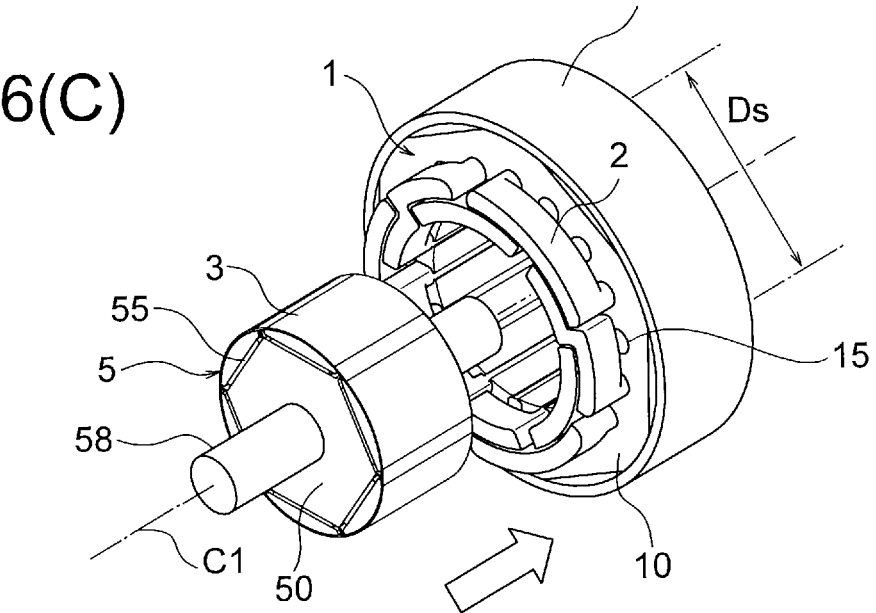

Then, as illustrated in FIG. 6(C), the rotor 5 to which the magnetization ring 3 is attached is inserted into the inside of the stator 1 (step S13). Since the outer diameter Do of the magnetization ring 3 is smaller than the inner diameter Ds of the stator 1, this insertion can be carried out easily. Consequently, as illustrated in FIG. 7(A), the magnetization ring 3 is disposed between the rotor 5 and the stator 1.

Then, the rotor 5 is aligned with respect to the stator 1 in the circumferential direction (step S14). With this alignment, as illustrated in FIG. 3, the slot openings 14 face the inter-pole portions M of the rotor 5, while three teeth 12 face each magnetic pole, i.e., each permanent magnet 55.

In this state, the magnetization current is applied to the coils 2 (step S15). As illustrated in FIG. 8, a power source 40 for magnetization has power source terminals 41, which are connected to the coils 2 by lead wires 42. In the power source 40, an electric charge stored in a capacitor is discharged, and high current (i.e., magnetization current) instantaneously flows through the coils 2 (see FIG. 14 described later). The magnetization current is higher than a drive current that flows through the coils 2 when the motor 100 is driven.

FIG. 9(A) is a diagram illustrating the magnetization ring 3, the stator 1, and the rotor 5 during the magnetization process, and FIG. 9(B) is a diagram illustrating the magnetization current applied to the coils 2 during the magnetization process. The coils 2 include a U-phase coil portion 2U, a V-phase coil portion 2V, and a W-phase coil portion 2W. As illustrated in FIG. 9(A), two slots 15 face one permanent magnet 55, and the coil portions 2V and 2W are disposed in these two slots 15. The coil portion 2U is disposed in the slot 15 facing the inter-pole portion M.

As illustrated in FIG. 9(B), the coil portions 2V and 2W are short-circuited, and the magnetization current "i" is applied to the coil portion 2U. The magnetization current of "i/2" is applied to each of the coil portions 2V and 2W. A flow direction of the magnetization current is a direction so as to generate the magnetic flux directed from outside to inside in the radial direction in the three teeth 12 facing the permanent magnet 55.

The permanent magnet 55 adjacent to the permanent magnet 55 illustrated in FIG. 3 is magnetized in the opposite direction, and thus the flow direction of the magnetization magnetic flux for the adjacent permanent magnet 55 is opposite to the above described flow direction.

The magnetization magnetic flux flows from the tip portions 13 of the teeth 12 to the rotor 5 through the magnetic portions 32 of the magnetization ring 3. In the rotor 5, the magnetization magnetic flux flows through the rotor core 50 and further flows in the radial direction through the permanent magnets 55 in the magnet insertion holes 51. Consequently, the permanent magnets 55 are magnetized in the thickness direction.

Since the magnetic portion 32 of the magnetization ring 3 is disposed between the rotor 5 and the stator 1, the magnetization magnetic flux from the stator 1 can be efficiently guided to the rotor 5 via the magnetic portion 32, and guided to the permanent magnet 55.

Further, the nonmagnetic portion 31 of the magnetization ring 3 faces the inter-pole portion M of the rotor 5. With the nonmagnetic portion 31, the magnetization magnetic flux from the tooth 12 can be inhibited from flowing to its adjacent tooth 12 across the inter-pole portion M. That is, short-circuit of the magnetization magnetic flux can be suppressed.

In particular, since the width W1 of the nonmagnetic portion 31 is wider than the width W2 of the slot opening 14 (W1>W2), the magnetization magnetic flux is less likely to flow between the tip portions 13 of the teeth 12 adjacent to each other across the inter-pole portion M. Thus, the effect of suppressing the short-circuit of the magnetization magnetic flux can be enhanced.

Figure 7B:
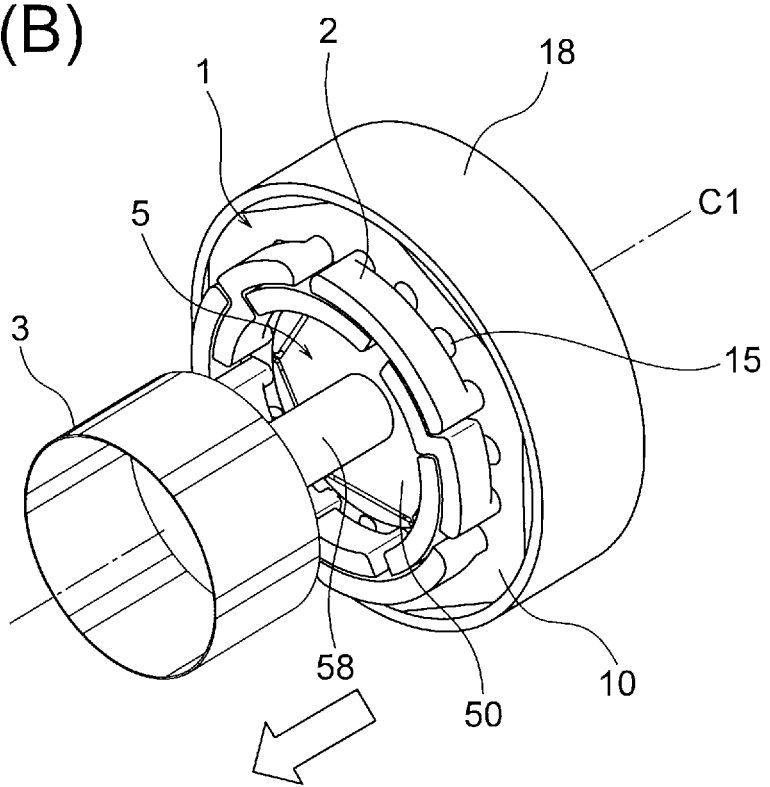
Figure 8:
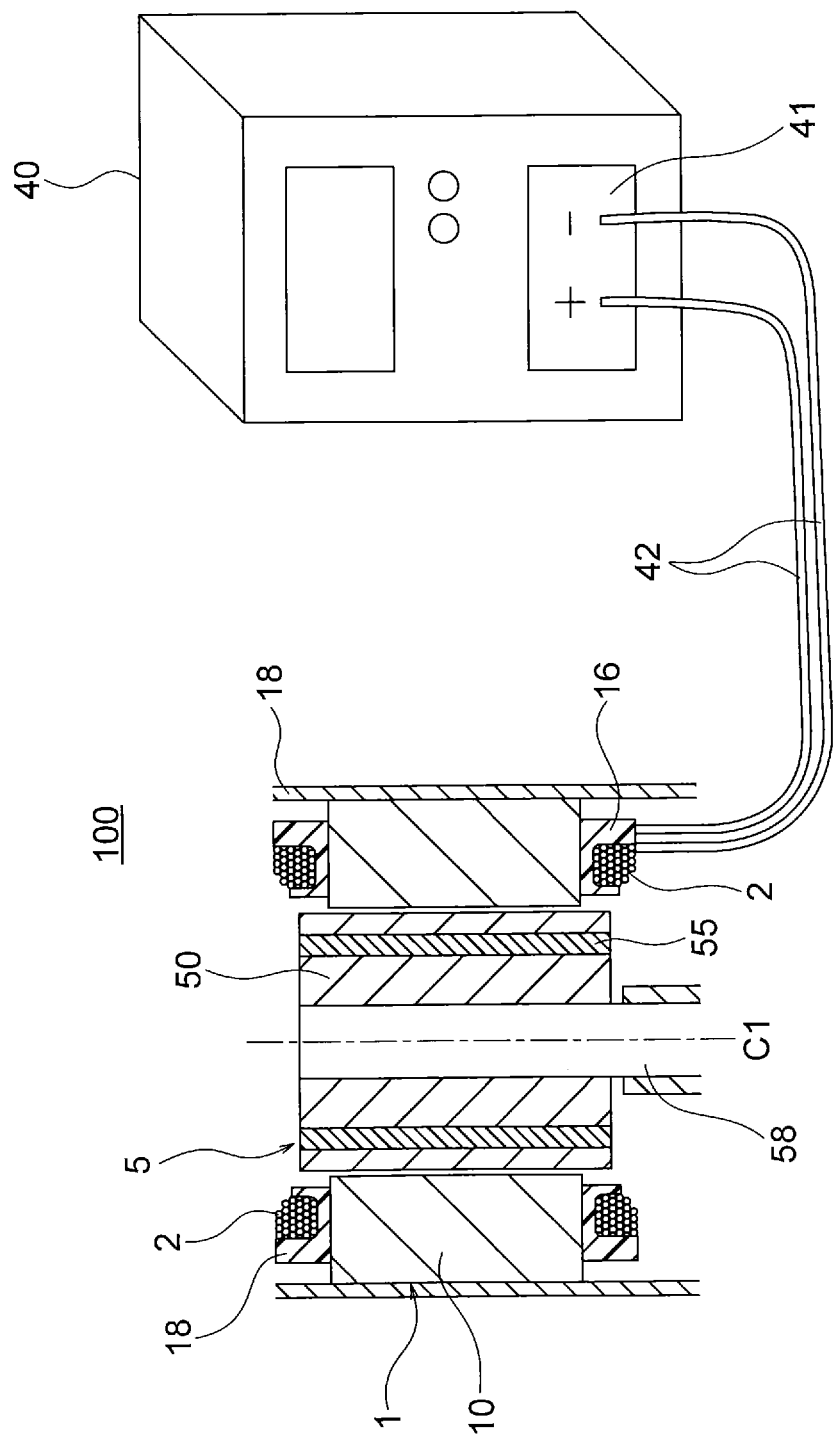
FIG. 8 is a diagram illustrating a configuration for the magnetization according to the first embodiment.

After the magnetization of the permanent magnets 55 is performed in this way, the magnetization ring 3 is detached from between the rotor 5 and the stator 1 as illustrated in FIG. 7(B) (step S16). Since the magnetization ring 3 is cylindrical, this detachment can be carried out easily.

In steps S11 to S13 described above, the magnetization ring 3 is attached to the rotor 5, and then the rotor 5 is inserted into the inside of the stator 1 (FIGS. 6(A) to (C)). However, the magnetization process is not limited to such a method.

Figure 10A:
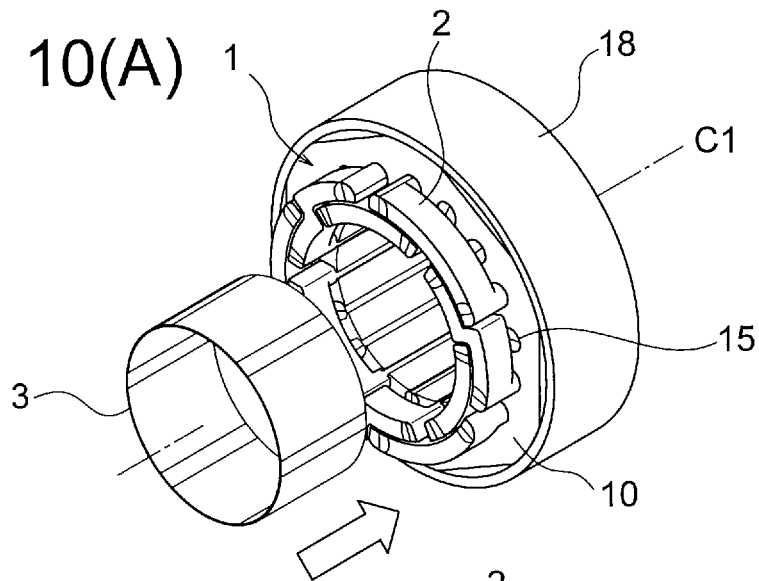
FIGS. 10(A), 10(B), and 10(C) are perspective views illustrating steps of another example of the magnetization process according to the first embodiment.
Figure 10B:
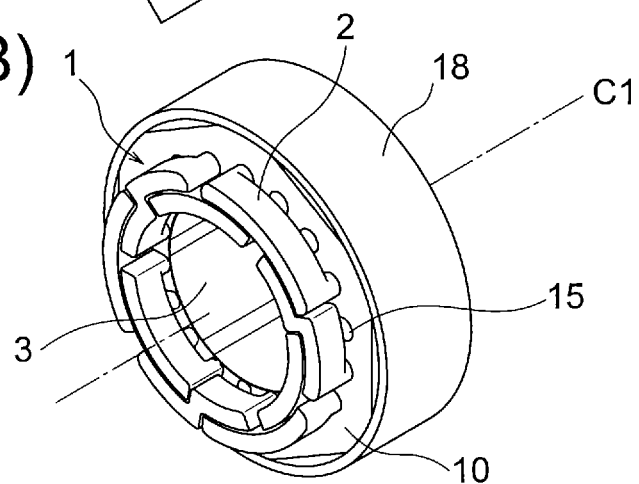
Figure 10C:
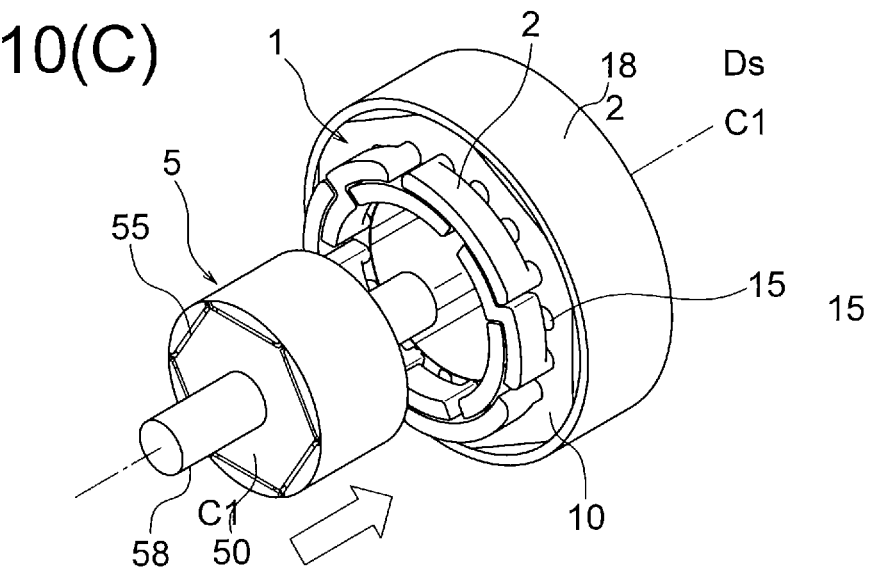

FIGS. 10(A) to 10(C) are perspective views illustrating steps of another example of the magnetization process according to the first embodiment. In this example, as illustrated in FIG. 10(A), the magnetization ring 3 is inserted into the inside of the stator 1.

Then, the position of the magnetization ring 3 is adjusted with respect to the stator 1 in the circumferential direction as illustrated in FIG. 10(B). That is, the nonmagnetic portions 31 of the magnetization ring 3 are made to face the slot openings 14. Then, as illustrated in FIG. 10(C), the rotor 5 is inserted into the inside of the stator 1 to which the magnetization ring 3 is attached.

Subsequently, the permanent magnets 55 are magnetized by applying the magnetization current to the coils 2 as described with reference to FIG. 7(A). Since the magnetization ring 3 is disposed between the rotor 5 and the stator 1, the magnetization magnetic flux can be efficiently guided to the permanent magnets 55. Thereafter, the magnetization ring 3 is detached from between the rotor 5 and the stator 1 as described with reference to FIG. 7(B).

(Functions)

Figure 11:
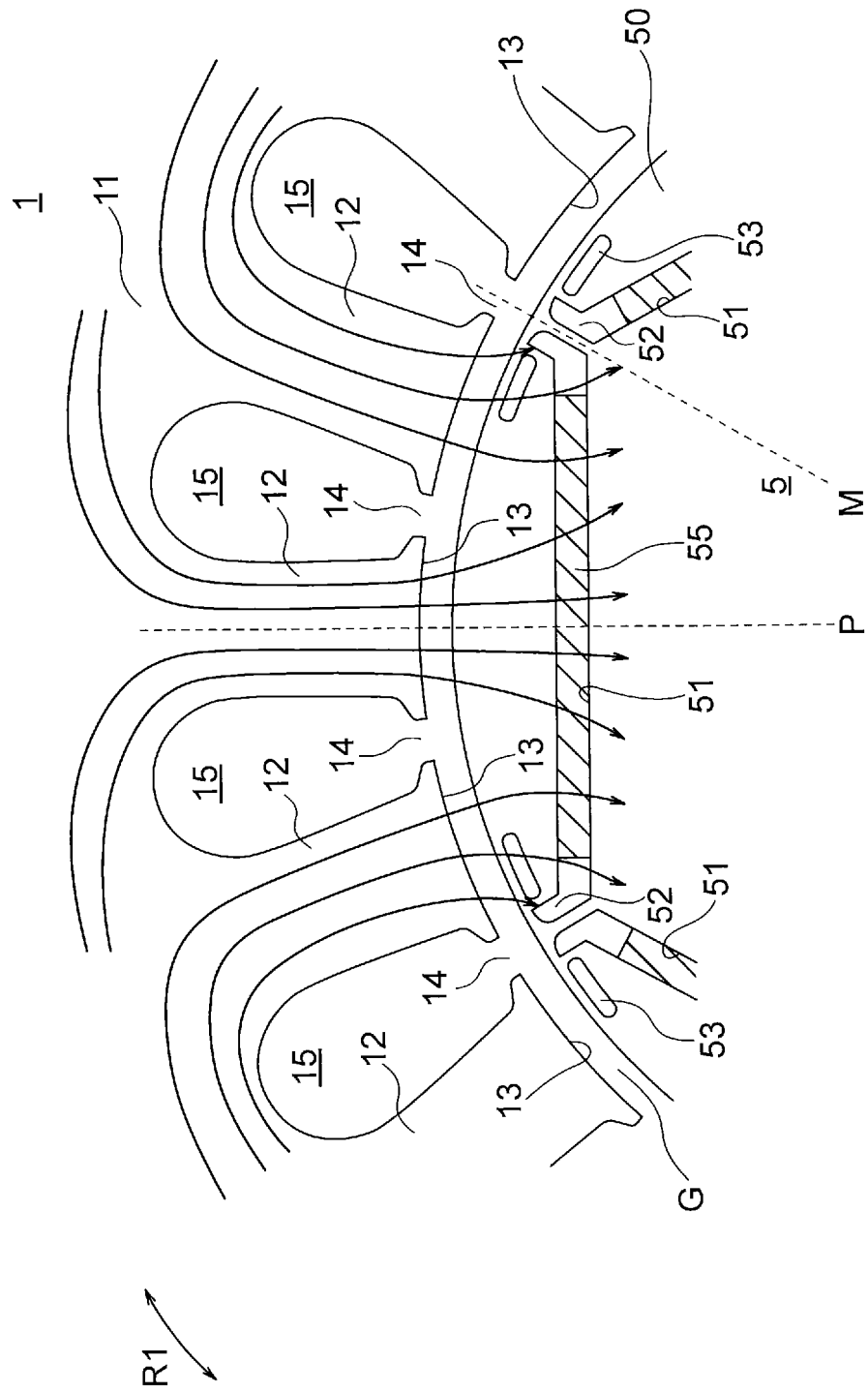
FIG. 11 is a diagram illustrating the stator, and the rotor according to Comparative Example 1.
Figure 12:
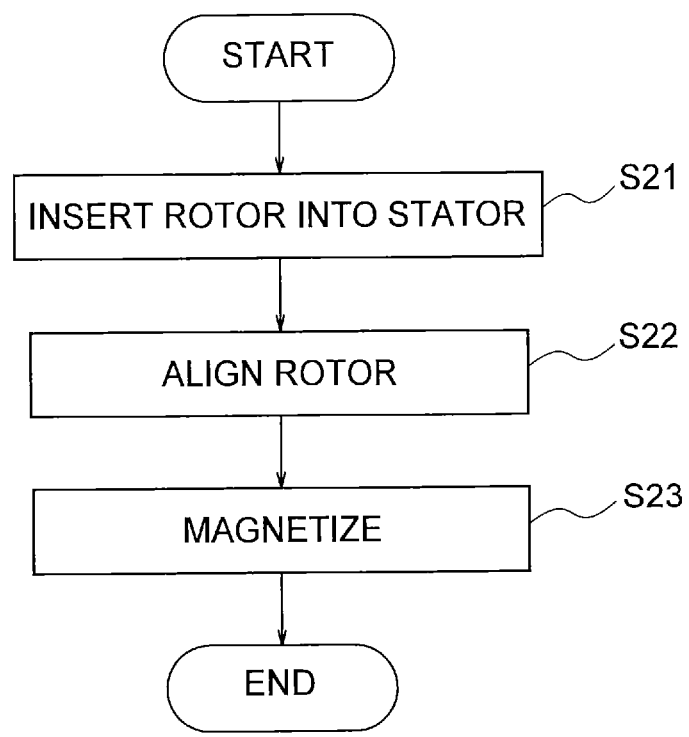
FIG. 12 is a flowchart illustrating a magnetization process according to Comparative Example 1.
Figure 13A:
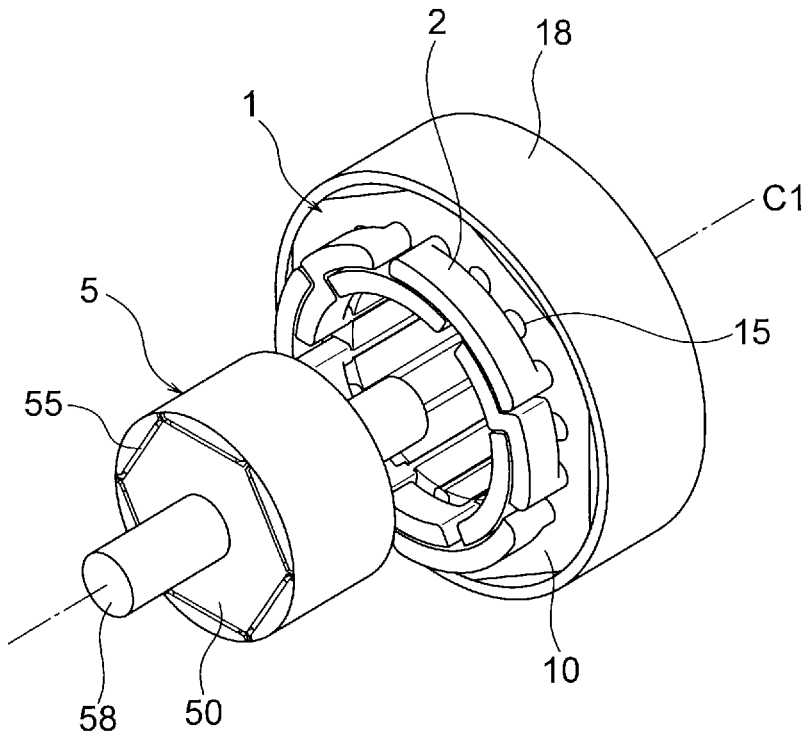
FIGS. 13(A) and 13(B) are perspective views illustrating steps of the magnetization process according to Comparative Example 1.
Figure 13B:
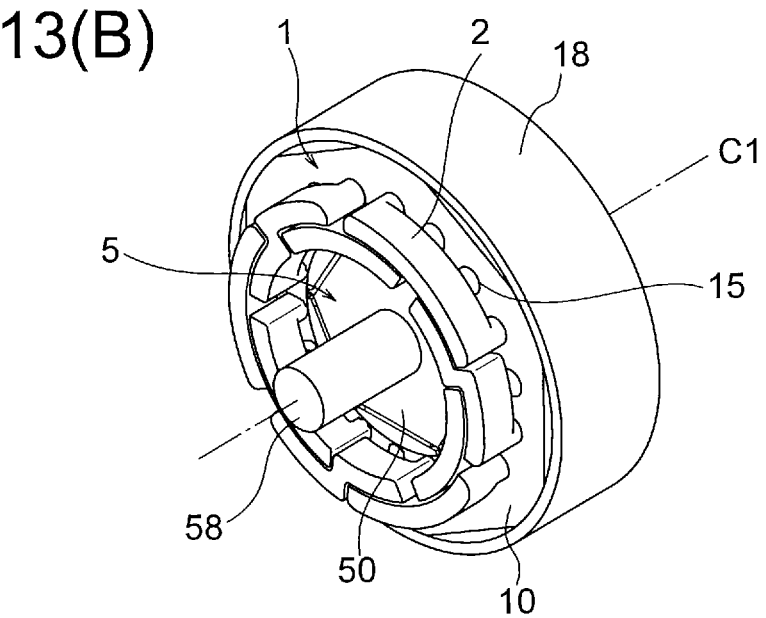

Next, the functions of the first embodiment will be described in comparison with Comparative Examples 1 and 2. FIG. 11 is a schematic diagram illustrating the stator 1 and the rotor 5 in a magnetization process according to Comparative Example 1. FIG. 12 is a flowchart illustrating the magnetization process of Comparative Example 1. FIGS. 13(A) and 13(B) are perspective views illustrating steps of the magnetization process of Comparative Example 1.

In the magnetization process of Comparative Example 1, the magnetization ring 3 described in the first embodiment is not used. In this case, the rotor 5 is inserted into the inside of the stator 1 (step S21), and then the rotor 5 is aligned with respect to the stator 1 in the circumferential direction (step S22). Specifically, the inter-pole portions M of the rotor 5 are made to face the slot openings 14 of the stator 1. Subsequently, the permanent magnets 55 are magnetized by applying the magnetization current to the coils 2 to generate the magnetization magnetic flux.

The magnetization magnetic flux generated by the magnetization current flows to the rotor 5 via the air gap between the rotor 5 and the stator 1. The air in the air gap is nonmagnetic, and thus it is difficult to efficiently guide the magnetization magnetic flux to the permanent magnets 55.

As described above, the magnetization current is higher than the drive current applied to the coils 2 when the motor 100 is driven. When the magnetization current is increased, it may cause wear of the coils 2 due to the Lorentz force. For this reason, it is necessary to limit the magnetization current, which makes it difficult to magnetize the permanent magnets 55 with high magnetic force.

In contrast, in the first embodiment, the magnetization ring 3 disposed between the rotor 5 and the stator 1 includes the magnetic portions 32 facing the pole centers P of the rotor 5 and the nonmagnetic portions 31 facing the inter-pole portions M. Thus, the magnetization magnetic flux from the stator 1 can be efficiently guided to the permanent magnets 55 via the magnetic portions 32. Therefore, the magnetization current required to magnetize the permanent magnets 55 can be lowered, or the permanent magnets 55 with higher magnetic force can be magnetized with the same magnetization current.

Figure 14:
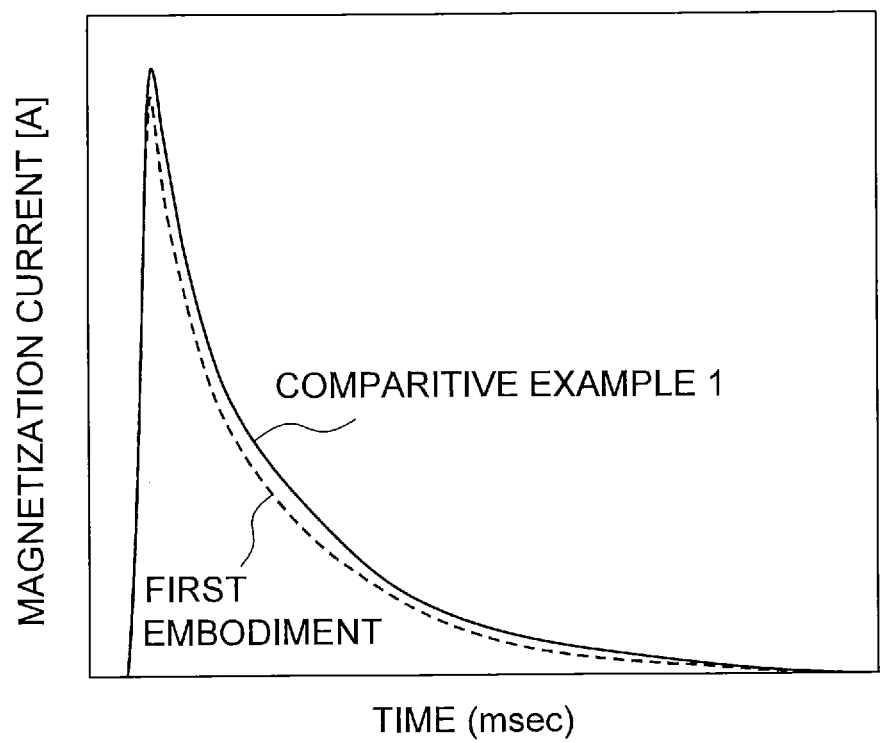
FIG. 14 is a graph illustrating a comparison between changes with time of the magnetization current in the first embodiment and Comparative Example 1.

FIG. 14 is a graph illustrating a comparison between changes with time of the magnetization current applied by the power source 40 to the coils 2 in the first embodiment and Comparative Example 1. The magnetization current in the first embodiment is indicated by a broken line, while the magnetization current in Comparative Example 1 is indicated by a solid line.

In the magnetization process, the permanent magnets 55 are magnetized by instantaneously applying the high magnetization current to the coils 2. From FIG. 14, it is understood that the magnetization current required to magnetize the permanent magnets 55 in the first embodiment is lower than that in Comparative Example 1.

Figure 15:
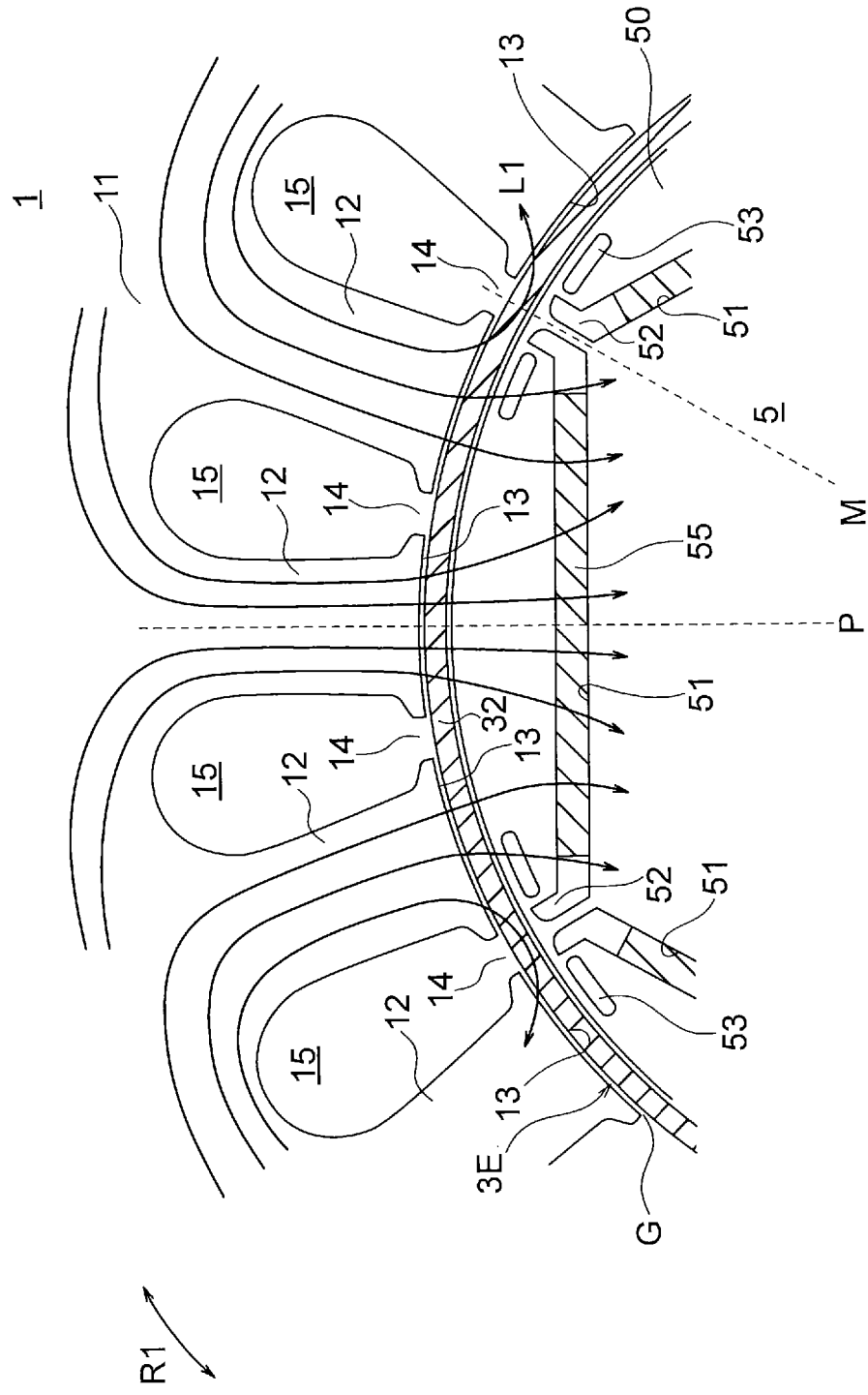
FIG. 15 is a diagram illustrating a magnetization ring, the stator, and the rotor according to Comparative Example 2.

FIG. 15 is a diagram illustrating a magnetization ring 3E, the stator 1, and the rotor 5 according to Comparative Example 2. In FIG. 15, the magnetization ring 3E, which is entirely made of a magnetic body, is disposed between the rotor 5 and the stator 1. Since the magnetization ring 3E is disposed between the rotor 5 and the stator 1, the magnetization magnetic flux is likely to flow to the rotor 5.

However, since the entire magnetization ring 3E is made of the magnetic body, the magnetization magnetic flux from the tooth 12 flows to its adjacent tooth 12 across the inter-pole portion M through the magnetization ring 3E (as indicated by an arrow L1). That is, the short-circuit of the magnetization magnetic flux occurs. For this reason, it is difficult to efficiently guide the magnetization magnetic flux to the permanent magnets 55.

In contrast, in the first embodiment, the magnetization ring 3 disposed between the rotor 5 and the stator 1 includes the magnetic portions 32 facing the pole centers P of the rotor 5 and the nonmagnetic portions 31 facing the inter-pole portions M. Thus, the magnetization magnetic flux from the stator 1 can be efficiently guided to the permanent magnets 55 by the magnetic portions 32. In addition, since the nonmagnetic portions 31 face the inter-pole portions M of the rotor 5, the short-circuit of the magnetization magnetic flux can be suppressed. As a result, the magnetization current required to magnetize the permanent magnets 55 can be lowered, or the permanent magnets 55 with higher magnetic force can be magnetized with the same magnetization current.

Effects of Embodiment

As described above, in the first embodiment, the magnetization ring 3 is disposed between the rotor 5 and the stator 1 as the core portion, and the magnetization ring 3 has the magnetic portions 32 facing the pole centers P of the rotor 5 and the nonmagnetic portions 31 facing the inter-pole portions M. Thus, the magnetization magnetic flux from the stator 1 can be efficiently guided to the permanent magnets 55, and therefore the permanent magnets 55 can be efficiently magnetized. That is, the magnetization current required to magnetize the permanent magnets 55 can be lowered, or the permanent magnets 55 with higher magnetic force can be magnetized with the same magnetization current. Since the nonmagnetic portions 31 and the magnetic portions 32 constitute the magnetization ring 3, the magnetization ring 3 can be easily handled. That is, it is possible to efficiently magnetize the permanent magnets 55 with a simple operation.

Since a plurality of nonmagnetic portions 31 and a plurality of magnetic portions 32 are arranged in the circumferential direction, a plurality of permanent magnets 55 of the rotor 5 can be efficiently magnetized.

Since the width W1 of the nonmagnetic portion 31 is wider than the width W2 of the slot opening 14 of the slot 15, the effect of suppressing the short-circuit of the magnetization magnetic flux can be enhanced.

Since the gap G between the rotor 5 and the stator 1 and the thickness T of the magnetization ring 3 satisfy G≥T>0, the magnetization ring 3 can be easily disposed in the air gap between the rotor 5 and the stator 1.

The inner diameter Di of the magnetization ring 3 is larger than the outer diameter Dr of the rotor 5, while the outer diameter Do of the magnetization ring 3 is smaller than the inner diameter Ds of the stator 1. Thus, the attachment and detachment of the magnetization ring 3 can be facilitated.

Second Embodiment

Figure 16:
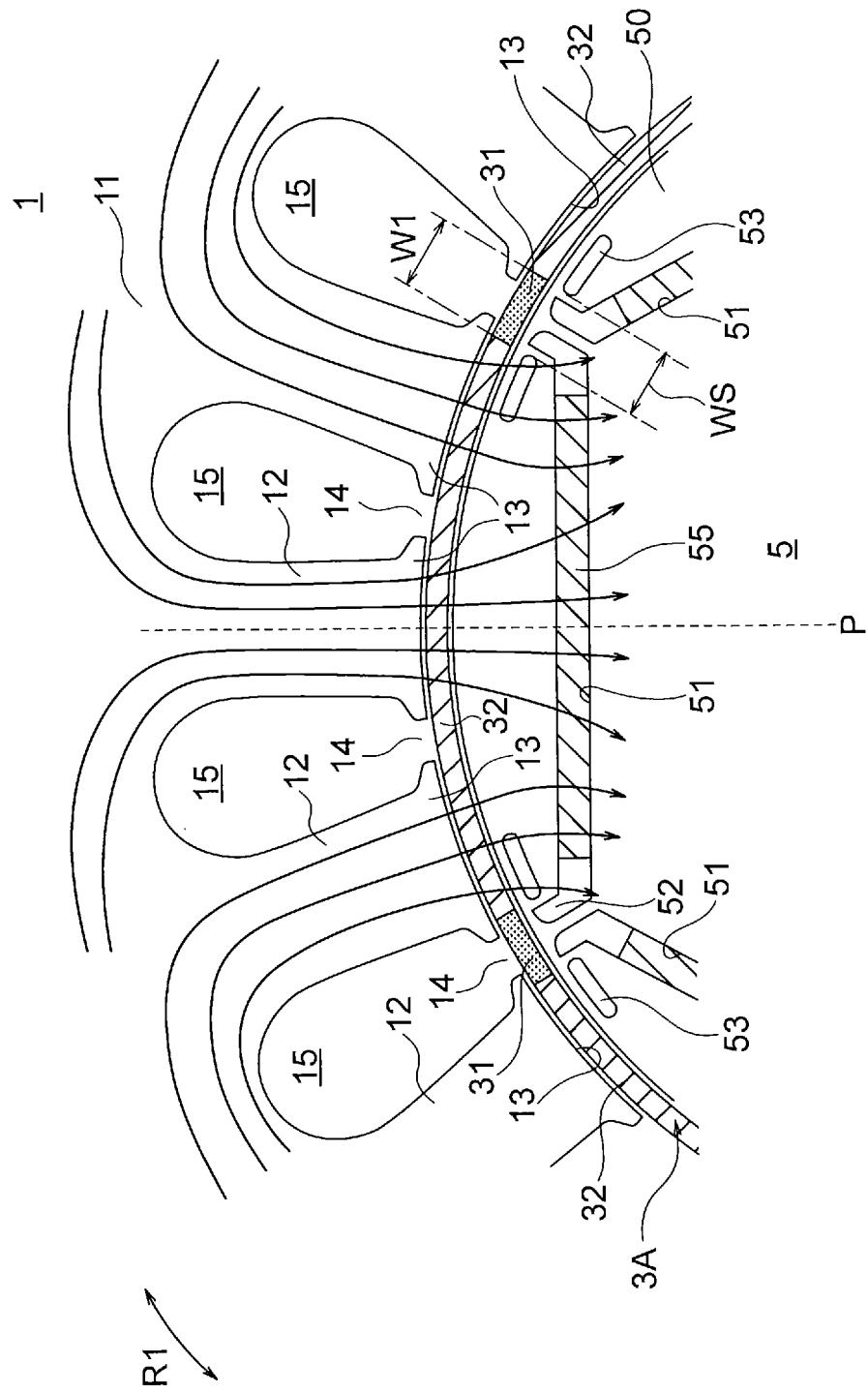
FIG. 16 is a diagram illustrating a magnetization ring, the stator, and the rotor according to a second embodiment.

Next, a second embodiment will be described. FIG. 16 is a diagram illustrating a magnetization ring 3A, the stator 1, and the rotor 5 according to the second embodiment. As is the case with the magnetization ring 3 of the first embodiment, the magnetization ring 3A includes nonmagnetic portions 31 facing the inter-pole portions M of the rotor 5 and magnetic portions 32 facing the pole centers P.

In the first embodiment described above, the width W1 of the nonmagnetic portion 31 of the magnetization ring 3 is wider than the width W2 of the slot opening 14 as illustrated in FIG. 3. In contrast, in the second embodiment, the width W1 of the nonmagnetic portion 31 of the magnetization ring 3A is wider than a distance WS between two slits 53 adjacent to each other across the inter-pole portion M. That is, W1>WS is satisfied.

Since the width W1 of the nonmagnetic portion 31 is wider than the distance WS between the slits 53, the magnetization magnetic flux directed from the tooth 12 to the inter-pole portion M of the rotor 5 is blocked by the nonmagnetic portion 31 and is less likely to flow to its adjacent tooth 12. As a result, the short-circuit of the magnetization magnetic flux indicated by the arrow L1 in FIG. 15 is suppressed. Thus, the magnetization magnetic flux can be guided to the permanent magnets 55 more efficiently than in the first embodiment.

As described above, in the second embodiment, the width W1 of the nonmagnetic portion 31 of the magnetization ring 3A is wider than the distance WS between two slits 53 adjacent to each other across the inter-pole portion M. Thus, the magnetization magnetic flux can be guided to the permanent magnets 55 more efficiently, in addition to the effects of the first embodiment.

Third Embodiment

Figure 17:
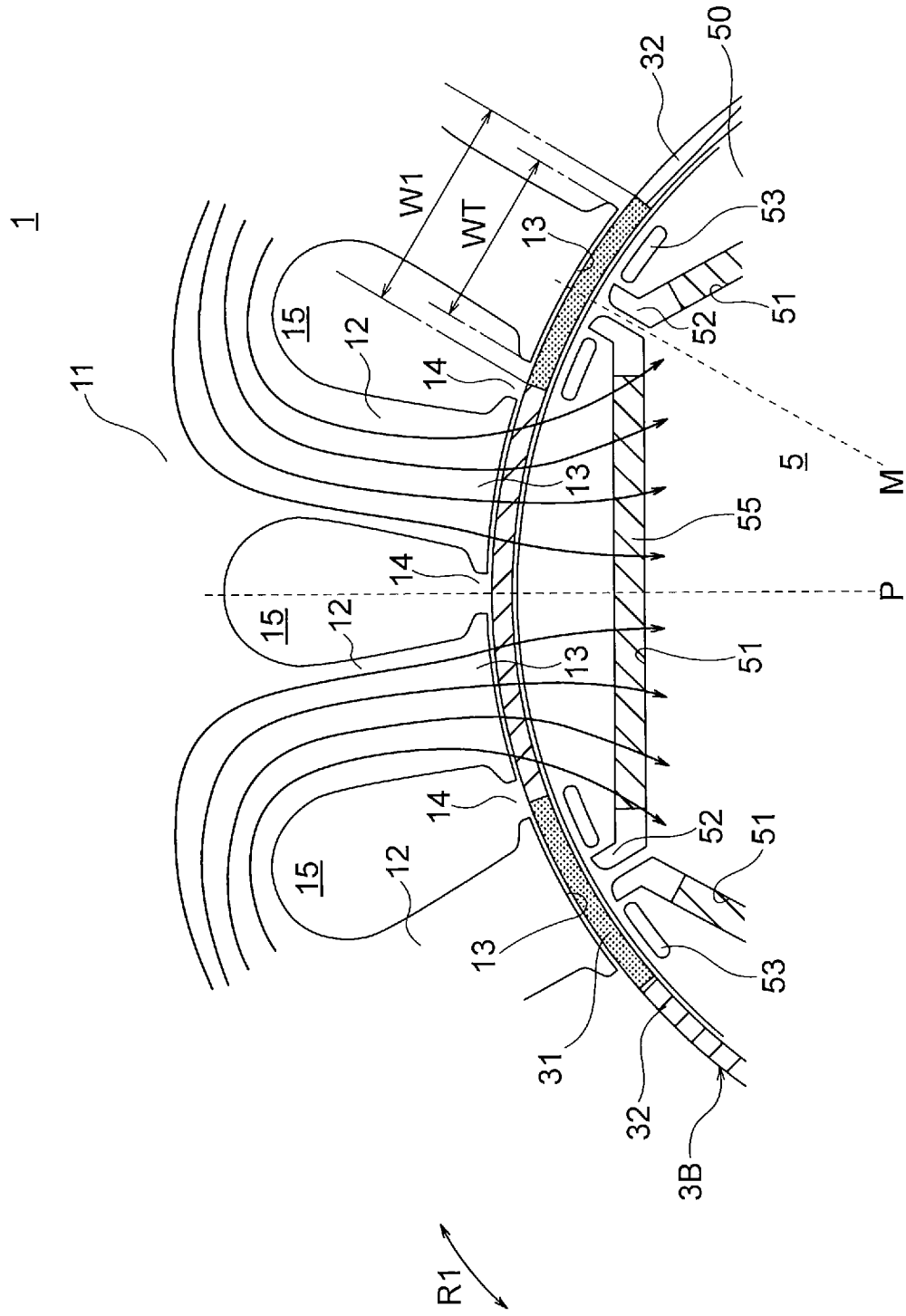
FIG. 17 is a diagram illustrating a magnetization ring, the stator, and the rotor according to a third embodiment.

Next, a third embodiment will be described. FIG. 17 is a diagram illustrating a magnetization ring 3B, the stator 1, and the rotor 5 according to the third embodiment.

In the first and second embodiments described above, the permanent magnets 55 are magnetized in a state where the inter-pole portions M of the rotor 5 face the slot openings 14 of the stator 1. In contrast, in the third embodiment, the permanent magnets 55 are magnetized in a state where the inter-pole portions M of the rotor 5 face the teeth 12 of the stator 1. Each magnetic pole of the rotor 5, i.e., each permanent magnet 55, faces two teeth 12.

The magnetization ring 3B is disposed between the rotor 5 and the stator 1. The magnetization ring 3B includes nonmagnetic portions 31 facing the inter-pole portions M of the rotor 5 and magnetic portions 32 facing the pole centers P. The nonmagnetic portions 31 face the teeth 12. The width W1 of the nonmagnetic portion 31 in the circumferential direction is wider than a width WT of the tip portion 13 of the tooth 12.

Figure 18B:
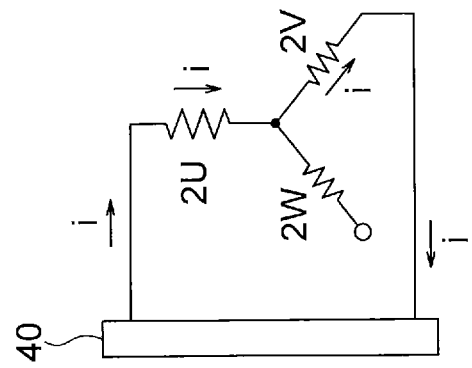
FIG. 18(B) is a diagram illustrating magnetization current flowing through coils.
Figure 18A:
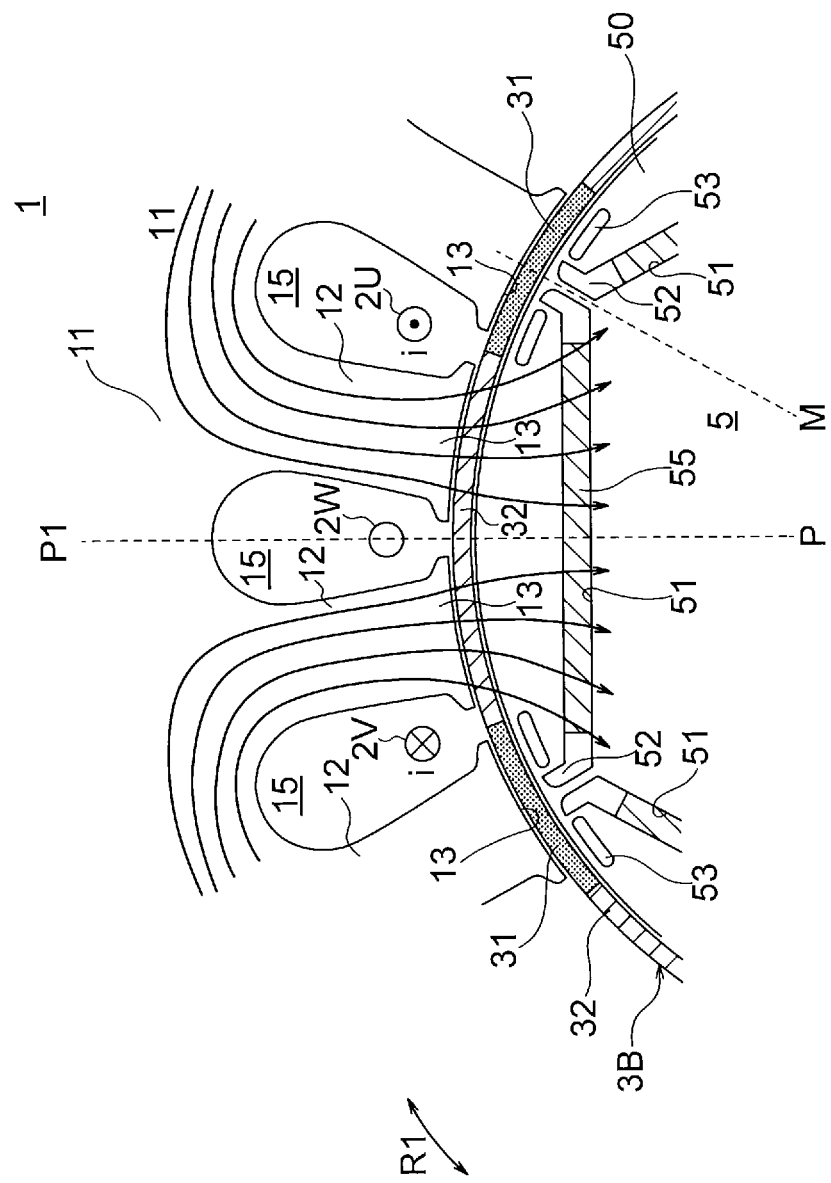
FIG. 18(A) is a diagram illustrating a magnetization process according to the third embodiment.

FIG. 18(A) is a diagram illustrating the magnetization ring 3B, the stator 1, and the rotor 5 during the magnetization process. FIG. 18(B) is a diagram illustrating the magnetization current applied to the coils 2 during the magnetization process. The coils 2 wound around the teeth 12 include a U-phase coil portion 2U, a V-phase coil portion 2V, and a W-phase coil portion 2W.

As illustrated in FIG. 18(A), one permanent magnet 55 faces three slots 15, and the coil portions 2V, 2W, and 2U are disposed in these three slots 15. As illustrated in FIG. 18(B), no magnetization current is applied to the coil portion 2W in the slot 15 located at the pole center P, while the magnetization current "i" is applied to each of the coil portions 2U and 2V in the slots 15 located on both sides of the pole center P. The flow direction of the magnetization current is a direction so as to generate the magnetic flux directed from outside to inside in the radial direction in the two teeth 12 facing the permanent magnet 55.

The magnetization magnetic flux flows from the tip portions 13 of the teeth 12 to the rotor 5 through the magnetic portions 32 of the magnetization ring 3B. In the rotor 5, the magnetization magnetic flux flows through the rotor core 50 and further flows in the radial direction through the permanent magnets 55 in the magnet insertion hole 51. Consequently, the permanent magnets 55 are magnetized in the thickness direction.

Since the magnetic portion 32 of the magnetization ring 3B is disposed between the rotor 5 and the stator 1, the magnetization magnetic flux from the stator 1 can be efficiently guided to the rotor 5 via the magnetic portion 32, and guided to the permanent magnet 55.

Further, the nonmagnetic portion 31 of the magnetization ring 3B faces the inter-pole portion M of the rotor 5, and the width W1 of the nonmagnetic portion 31 is wider than the width WT of the tip portion 13 of the tooth 12 (FIG. 17). With the nonmagnetic portion 31, the magnetization magnetic flux from the tooth 12 facing the permanent magnet 55 can be inhibited from flowing to the tooth 12 facing the inter-pole portion M. That is, the short-circuit of the magnetization magnetic flux can be suppressed.

In order to enhance the effect of suppressing the short-circuit of the magnetization magnetic flux, it is desirable that the end of the nonmagnetic portion 31 in the circumferential direction reaches at least the center of the slot opening 14 in the circumferential direction as illustrated in FIG. 17.

Figure 19:
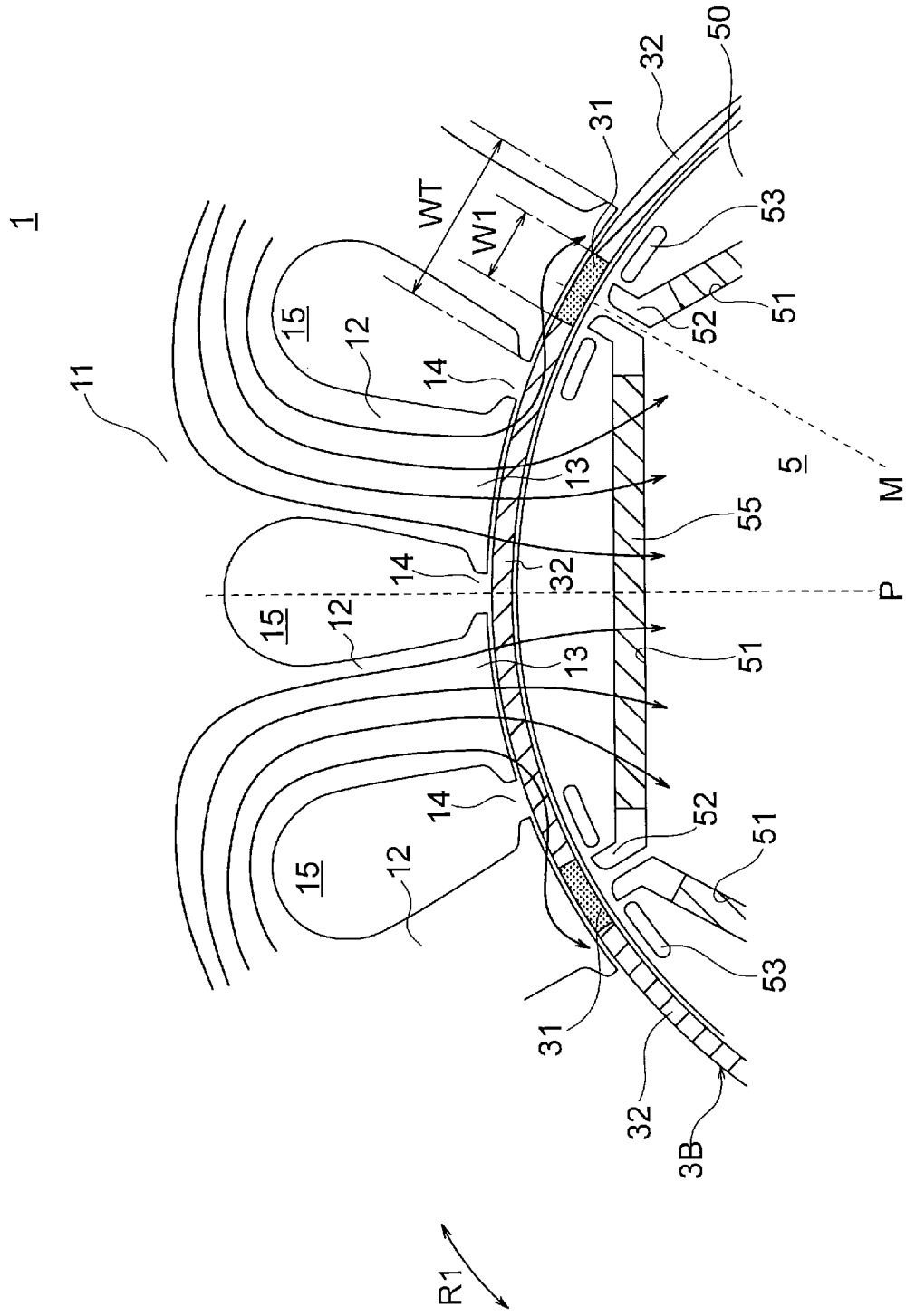
FIG. 19 is a diagram illustrating a magnetization ring, the stator, and the rotor according to the third embodiment.

FIG. 19 is a diagram illustrating a configuration example in which the width W1 of the nonmagnetic portion 31 of the magnetization ring 3B is narrower than the width WT of the tip portion 13 of the tooth 12. If the width W1 of the nonmagnetic portion 31 is narrower than the width WT of the tip portion 13 of the tooth 12, the tooth 12 facing the permanent magnet 55 and the tooth 12 facing the inter-pole portion M both face a common magnetic portion 32. Thus, the magnetization magnetic flux flowing through the tooth 12 facing the permanent magnet 55 may flow to the tip portion 13 of the tooth 12 facing the inter-pole portion M through the magnetic portion 32.

In contrast, as illustrated in FIG. 17, when the width W1 of the nonmagnetic portion 31 is wider than the width WT of the tip portion 13 of the tooth 12, the nonmagnetic portion 31 inhibits the magnetization magnetic flux from the tooth 12 facing the permanent magnet 55 from flowing to the tip portion 13 of the tooth 12 facing the inter-pole portion M.

As described above, in the third embodiment, when the permanent magnets 55 are magnetized in a state where the inter-pole portions M of the rotor 5 face the teeth 12 of the stator 1, the nonmagnetic portions 31 of the magnetization ring 3B face the inter-pole portions M of the rotor 5, and the width W1 of each nonmagnetic portion 31 is wider than the width WT of the tip portion 13 of the tooth 12. Therefore, the short-circuit of the magnetization magnetic flux can be suppressed by the nonmagnetic portions 31.

Fourth Embodiment

Figure 20:
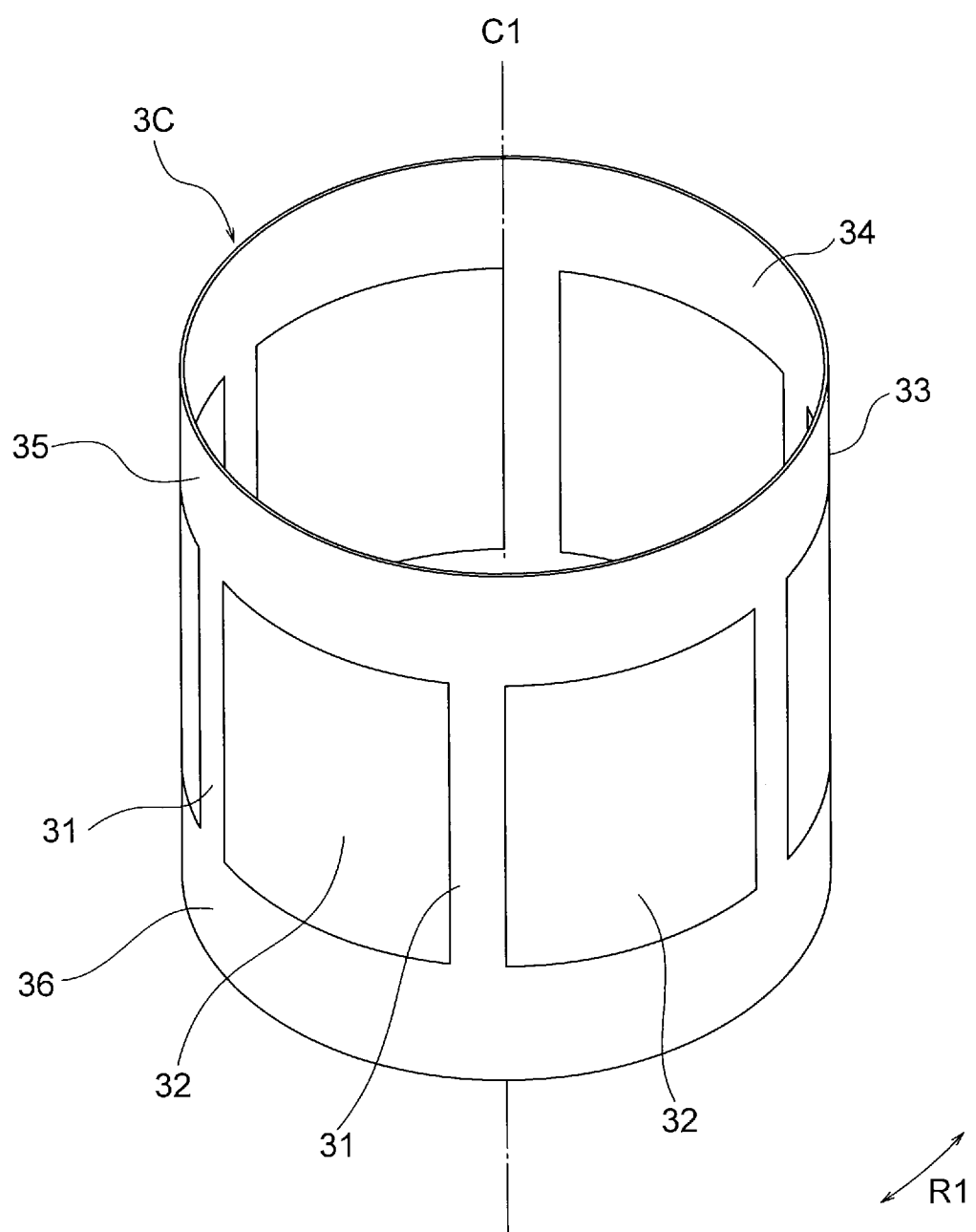
FIG. 20 is a perspective view illustrating a magnetization ring according to a fourth embodiment.

Next, a fourth embodiment will be described. FIG. 20 is a perspective view illustrating a magnetization ring 3C according to the fourth embodiment. The magnetization ring 3C has annular portions 35 and 36 provided on both ends thereof in the axial direction, in addition to the nonmagnetic portions 31 and the magnetic portions 32 described in the first embodiment.

Each of the annular portions 35 and 36 has an annular shape and is composed of a nonmagnetic body. The annular portions 35 and 36 are desirably formed continuously with the nonmagnetic portions 31. The configurations of the nonmagnetic portion 31 and the magnetic portion 32 are as described in the first embodiment.

The magnetization ring 3C has the annular portions 35 and 36, and thus a user can handle the magnetization ring 3C by gripping one or both of the annular portions 35 and 36. Therefore, the magnetizing operation can be carried out easily.

In the magnetization process, the nonmagnetic portions 31 and the magnetic portions 32 of the magnetization ring 3C are disposed between the rotor 5 and the stator 1. In this state, the annular portions 35 and 36 protrude from the rotor 5 and the stator 1 in the axial direction. Thus, the magnetization ring 3C can be easily detached.

In the example illustrated in FIG. 20, the annular portions 35 and 36 are provided on both ends of the magnetization ring 3C in the axial direction, but the annular portion may be provided on only one end of the magnetization ring 3C in the axial direction. The magnetization ring 3C and the magnetization method in the fourth embodiment are the same as those in the first embodiment, except for the points described above.

As described above, in the fourth embodiment, the magnetization ring 3C has the annular portion on at least one end thereof in the axial direction, and thus the handling of the magnetization ring 3C can be further facilitated.

Fifth Embodiment

Figure 21:
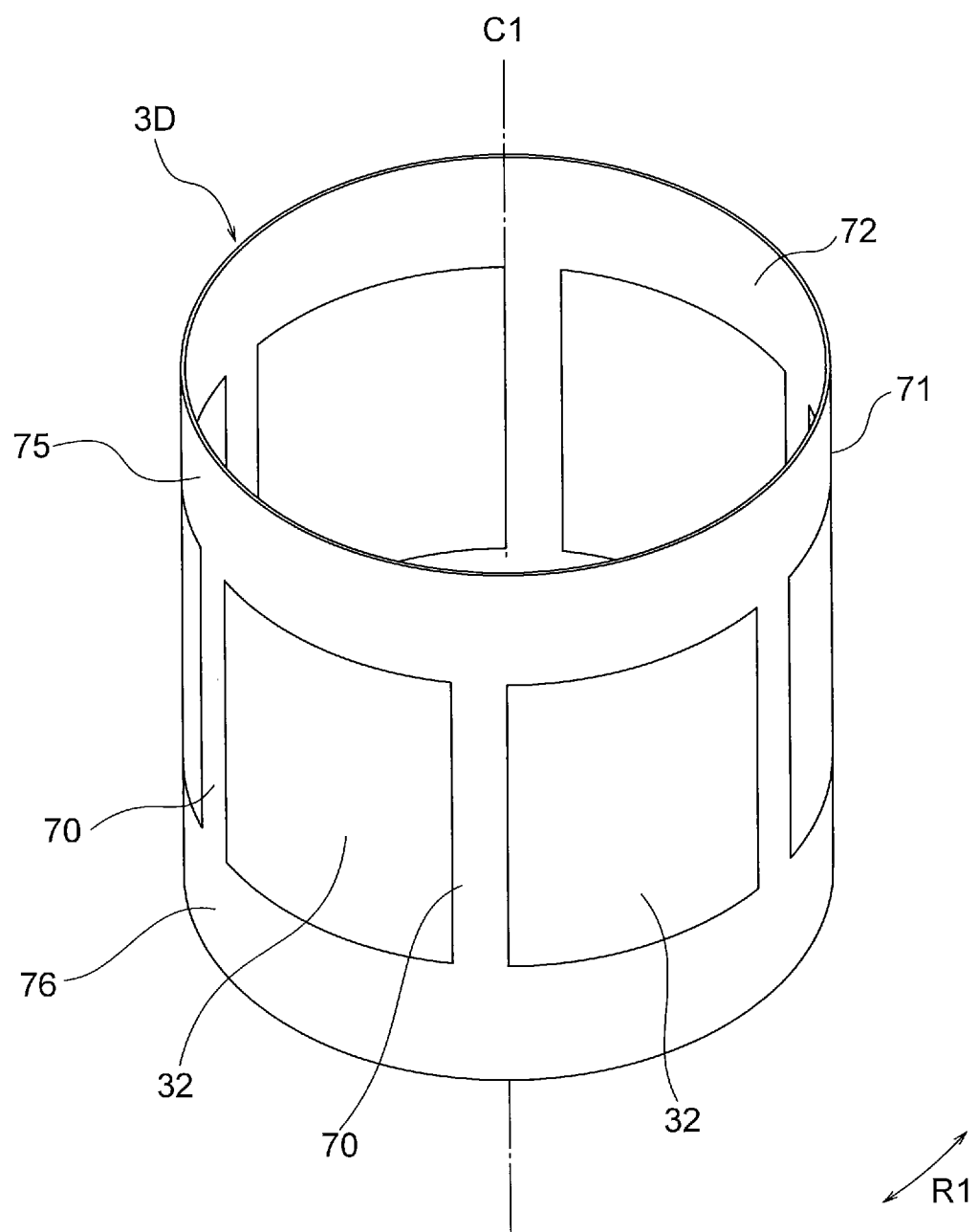
FIG. 21 is a perspective view illustrating a magnetization ring according to a fifth embodiment.

Next, a fifth embodiment will be described. FIG. 21 is a perspective view illustrating a magnetization ring 3D according to the fifth embodiment. The magnetization ring 3D has the magnetic portions 32 disposed similarly to those in the first embodiment, and films 71 and 72 on outer and inner sides of the magnetic portions 32 in the radial direction. The films 71 and 72 are composed of a nonmagnetic resin, for example, polyimide.

Figure 22:
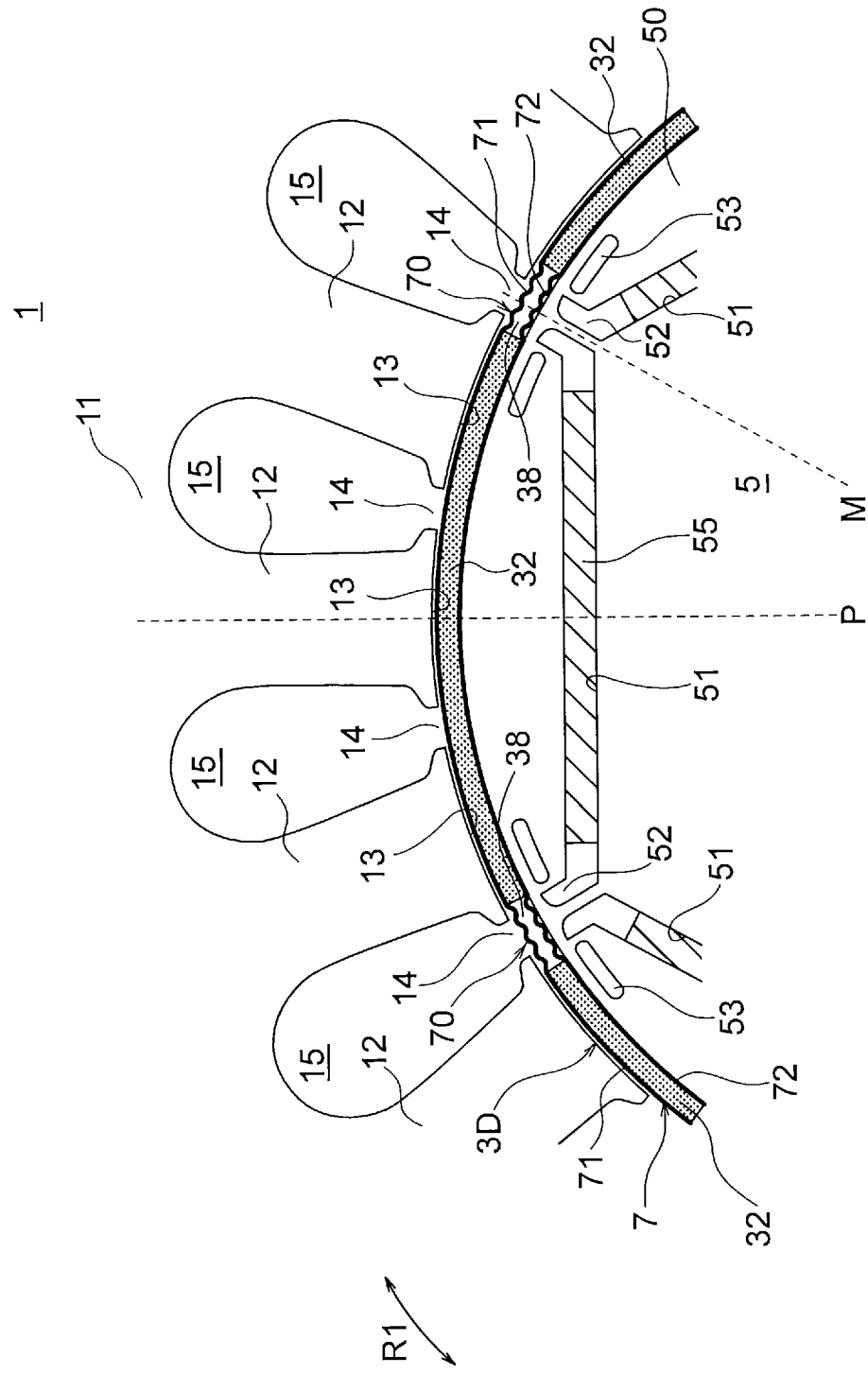
FIG. 22 is a diagram illustrating the magnetization ring, the stator, and the rotor according to the fifth embodiment.

FIG. 22 is a sectional view illustrating the stator 1, the rotor 5, and the magnetization ring 3D according to the fifth embodiment. Each magnetic portion 32 is formed at a position facing the pole center P of the rotor 5. The magnetic portion 32 is not provided at a position facing the inter-pole portion M of the rotor 5, and a hollow portion 38 is formed between adjacent two magnetic portions 32 in the circumferential direction.

The hollow portion 38 and the films 71 and 72 on the outer side and inner side of the hollow portion 38 in the radial direction constitute a nonmagnetic portion 70. That is, the nonmagnetic portion 70 is formed at the position facing the inter-pole portion M of the rotor 5.

The magnetization ring 3D has annular portions 75 and 76 (FIG. 21) on both ends thereof in the axial direction. Each of the annular portions 75 and 76 is a nonmagnetic body in an annular shape. Each of the annular portions 75 and 76 is obtained by bonding the films 71 and 72 to each other. The films 71 and 72 are bonded to each other at the nonmagnetic portions 70 and at the annular portions 75 and 76 in such a manner that the magnetic portions 32 are sandwiched between the films 71 and 72.

As shown in FIG. 22, when the permanent magnets 55 are magnetized in a state where the inter-pole portions M of the rotor 5 face the slot openings 14 of the stator 1, the nonmagnetic portions 70 of the magnetization ring 3D face the slot openings 14.

As described in the first embodiment, in order to enhance the effect of suppressing the short-circuit of the magnetization magnetic flux, the width W1 (FIG. 3) of the nonmagnetic portion 70 in the circumferential direction is desirably wider than the width W2 (FIG. 3) of the slot opening 14 in the circumferential direction. As described in the second embodiment, it is further desirable that the width W1 of the nonmagnetic portion 70 in the circumferential direction is wider than the distance WS (FIG. 16) between two slits 53 adjacent to each other across the inter-pole portion M.

As described in the third embodiment, when the permanent magnets 55 are magnetized in a state where the inter-pole portions M of the rotor 5 face the teeth 12 of the stator 1, the nonmagnetic portions 70 face the tip portions 13 of the teeth 12. In this case, in order to enhance the effect of suppressing the short-circuit of the magnetization magnetic flux, the width W1 (FIG. 17) of the nonmagnetic portion 70 in the circumferential direction is desirably wider than the width WT of the tip portion 13 of the tooth 12. It is further desirable that the end of the nonmagnetic portion 70 in the circumferential direction reaches the center of the slot opening 14 in the circumferential direction.

In this example, the magnetization ring 3D includes the films 71 and 72 on the stator 1 side and the rotor 5 side, respectively. However, the magnetization ring 3D may have only one of the films 71 and 72. The magnetization ring 3D and the magnetization method in the fifth embodiment are the same as those in the first embodiment, except for the points described above.

As described above, in the fifth embodiment, the magnetization ring 3D includes the film on at least one side thereof in the radial direction. Thus, wear due to contact between the magnetization ring 3D and the stator 1 or the rotor 5 can be suppressed, and the life of the magnetization ring 3D can be extended, in addition to the effects described in the first embodiment. Furthermore, adhesion of foreign matters such as magnetic powder generated by the wear to the rotor 5 can be suppressed, and thus the reliability of the motor 100 can be improved.

Since the magnetization ring 3D includes the annular portions 75 and 76, the user can handle the magnetization ring 3D by griping one or both of the annular portions 75 and 76. Therefore, the magnetizing operation can be carried out easily.

In FIG. 21, the magnetization ring 3D has the annular portions 75 and 76 on both ends thereof in the axial direction, but the magnetization ring 3D may have only one of the annular portions 75 and 76. Alternatively, the magnetization ring 3D may be formed to have none of the annular portions 75 and 76.

Sixth Embodiment

Next, a sixth embodiment will be described. In the first to fifth embodiments, the permanent magnets 55 are magnetized in a state where the rotor 5 is incorporated in the stator 1 of the motor 100. In the sixth embodiment, the permanent magnets 55 are magnetized in a state where the rotor 5 is incorporated in a magnetization yoke 80 of a magnetization apparatus 8.

Figure 23:
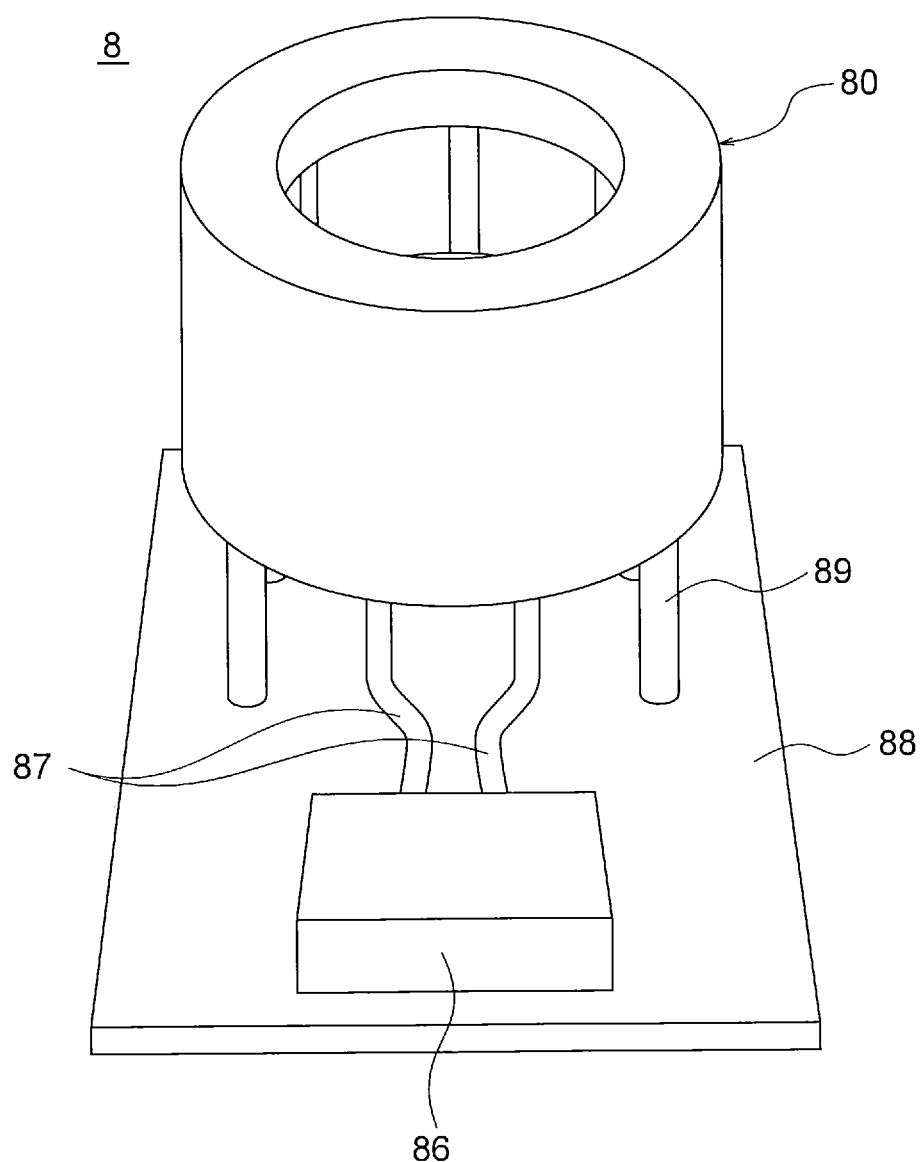
FIG. 23 is a diagram illustrating a magnetization apparatus according to a sixth embodiment.

FIG. 23 is a schematic diagram illustrating the magnetization apparatus 8 according to the sixth embodiment. The magnetization apparatus 8 includes the magnetization yoke 80, a power source 86, lead wires 87 that connect the magnetization yoke 80 and the power source 86, a base 88, and supporting portions 89 that support the magnetization yoke 80 on the base 88.

Figure 24:
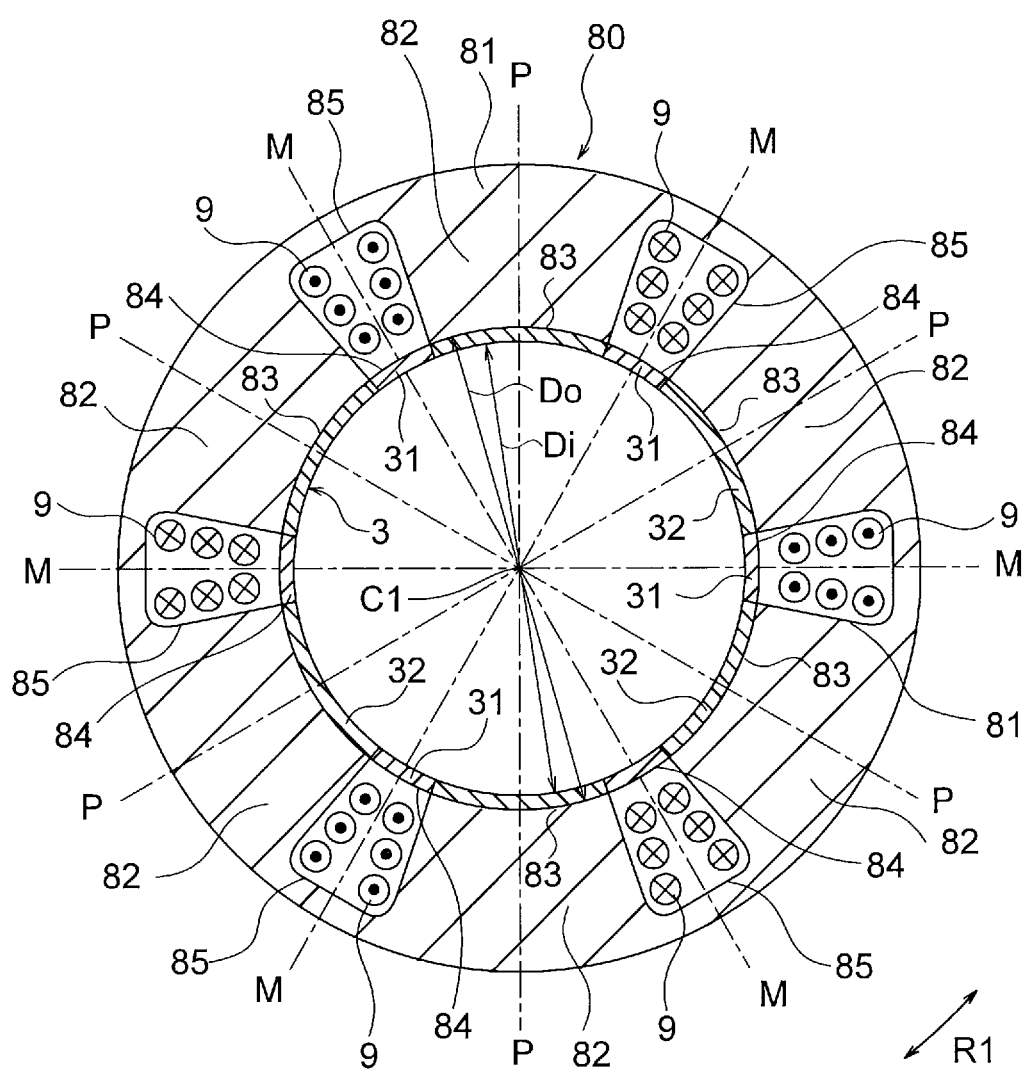
FIG. 24 is a diagram illustrating a magnetization yoke of the magnetization apparatus according to the sixth embodiment.

FIG. 24 is a sectional view illustrating the magnetization yoke 80. The magnetization yoke 80 is an annular member formed of a magnetic body. The magnetization yoke 80 includes a core back 81 of an annular shape about the axis C1 and a plurality of teeth 82 protruding from the core back 81 toward the axis C1.

The number of teeth 82 is the same as the number of poles of the rotor 5, which is six in this example. A slot 85 is formed between each two of the teeth 82 adjacent to each other in the circumferential direction. A slot opening 84 is formed at an end of the slot 85 on the inner side in the radial direction.

The coils 9 are wound around the teeth 82 in the concentrated winding or the distributed winding. The coils 9 are connected to the power source 86 illustrated in FIG. 23.

The magnetization ring 3 is fixed to the inner circumference of the magnetization yoke 80. The magnetization ring 3 includes the nonmagnetic portions 31 facing the slot openings 84 and the magnetic portions 32 facing the tip portions 83 of the teeth 82 on the inner side in the radial direction. As described in the first embodiment, the nonmagnetic portions 31 and the magnetic portions 32 are alternately disposed in the circumferential direction. The number of nonmagnetic portions 31 and the number of magnetic portions 32 are both the same as the number of poles of the rotor 5, which is six in this example.

The rotor 5 is disposed on the inner side of the magnetization yoke 80. In FIG. 24, positions of the pole centers P and the inter-pole portions M of the rotor 5 are indicated by dash-dotted lines. When the rotor 5 is disposed on the inner side of the magnetization yoke 80, the nonmagnetic portions 31 of the magnetization ring 3 face the inter-pole portions M of the rotor 5, while the magnetic portions 32 face the pole centers P.

The width of the nonmagnetic portion 31 in the circumferential direction is the same as the width of the slot opening 84 of the slot 85 in FIG. 24, but may be wider than the width of the slot opening 84 as described in the first embodiment. This enhances the effect of suppressing the short-circuit of the magnetization magnetic flux. As described in the second embodiment, the width of the nonmagnetic portion 31 in the circumferential direction may be wider than the distance WS (FIG. 16) between the slits 53 of the rotor 5.

The gap G (FIG. 2) between the rotor 5 and the magnetization yoke 80 and the thickness T (FIG. 4) of the magnetization ring 3 in the radial direction desirably satisfy G≥T>0. Thus, the magnetization ring 3 can be easily disposed in the gap between the rotor 5 and the magnetization yoke 80.

The inner diameter Di of the magnetization ring 3 is desirably larger than the outer diameter Dr (FIG. 6(A)) of the rotor 5 (Di>Dr). Thus, the rotor 5 can be easily disposed inside the magnetization ring 3 and can be easily detached from the magnetization ring 3.

In the magnetization apparatus 8, the magnetization ring 3 is fixed to the inner circumference of the magnetization yoke 80, and thus it is not necessary to detach the magnetization ring 3 from the magnetization yoke 80. Thus, the outer diameter Do of the magnetization ring 3 may desirably be larger than or equal to the inner diameter Ds of the magnetization yoke 80 (Do≥Ds).

In place of the magnetization ring 3, the magnetization ring 3D that has at least one of the films 71 and 72 as described in the fifth embodiment may be used.

Figure 25:
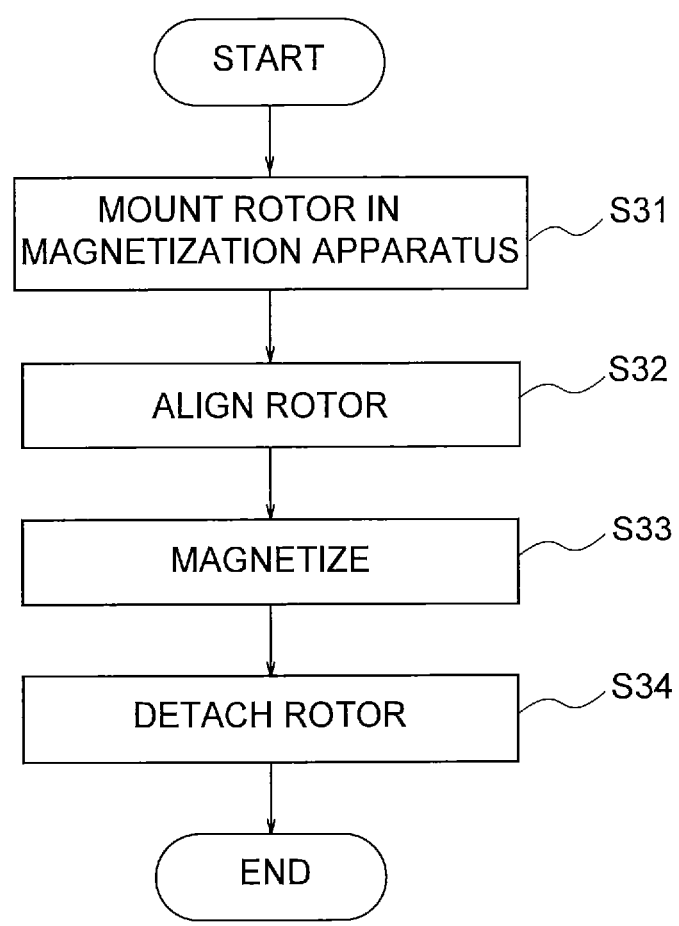
FIG. 25 is a flowchart illustrating a magnetization process according to the sixth embodiment.

FIG. 25 is a flowchart illustrating the magnetization process. In the magnetization process, the rotor 5 is mounted in the magnetization apparatus 8 (step S31). Thus, the rotor 5 is inserted into the inside of the magnetization ring 3 fixed to the magnetization yoke 80.

Then, the rotor 5 is aligned with respect to the magnetization yoke 80 in the circumferential direction (step S32). With this alignment, the slot openings 84 face the inter-pole portions M of the rotor 5, while each tooth 82 faces one magnetic pole, i.e., one permanent magnet 55.

In this state, the magnetization current is applied to the coils 9 by the power source 86, thereby generating the magnetization magnetic flux (step S33). The current is applied to the coils 9 so as to generate the magnetization magnetic flux flowing through the teeth 82 in the radial direction. The flow directions of the magnetization magnetic fluxes flowing through the adjacent teeth 82 are opposite to each other.

The magnetization magnetic flux flows from the tip portions 83 of the teeth 82 to the rotor 5 through the magnetic portions 32 of the magnetization ring 3. In the rotor 5, the magnetization magnetic flux flows through the rotor core 50 and further flows in the radial direction through the permanent magnets 55 in the magnet insertion holes 51. Consequently, the permanent magnets 55 are magnetized in the thickness direction.

Since the magnetic portions 32 of the magnetization ring 3 are disposed between the teeth 82 and the rotor 5, the magnetization magnetic flux from the teeth 82 can be efficiently guided to the permanent magnets 55.

Further, since the nonmagnetic portions 31 of the magnetization ring 3 face the inter-pole portions M of the rotor 5, the magnetization magnetic flux from the tooth 82 is inhibited from flowing into its adjacent tooth 82 across the inter-pole portion M. That is, the short-circuit of the magnetization magnetic flux can be suppressed.

After the magnetization of the permanent magnets 55 is completed, the rotor 5 is detached from the magnetization apparatus 8 (step S34). This completes the magnetization process of the permanent magnets 55. Thereafter, the rotor 5 is incorporated into the stator 1, and the motor 100 is completed.

As described above, in the sixth embodiment, the magnetization ring 3 is disposed between the magnetization yoke 80 as the core portion and the rotor 5, and the magnetization ring 3 includes the magnetic portions 32 facing the centers of the permanent magnets 55 of the rotor 5 in the circumferential direction and the nonmagnetic portions 31 facing the inter-pole portions M. Thus, the magnetization magnetic flux from the magnetization yoke 80 can be efficiently guided to the permanent magnets 55, and thus the permanent magnets 55 can be efficiently magnetized. That is, the current required to magnetize the permanent magnets 55 can be lowered, or the permanent magnets 55 with higher magnetic force can be magnetized with the same current.

In particular, since the magnetization ring 3 is fixed to the magnetization yoke 80, the magnetization ring 3 can be disposed between the rotor 5 and the magnetization yoke 80 by inserting the rotor 5 into the inside of the magnetization ring 3.

The first to sixth embodiments described above can be combined as appropriate.

(Compressor)

Figure 26:
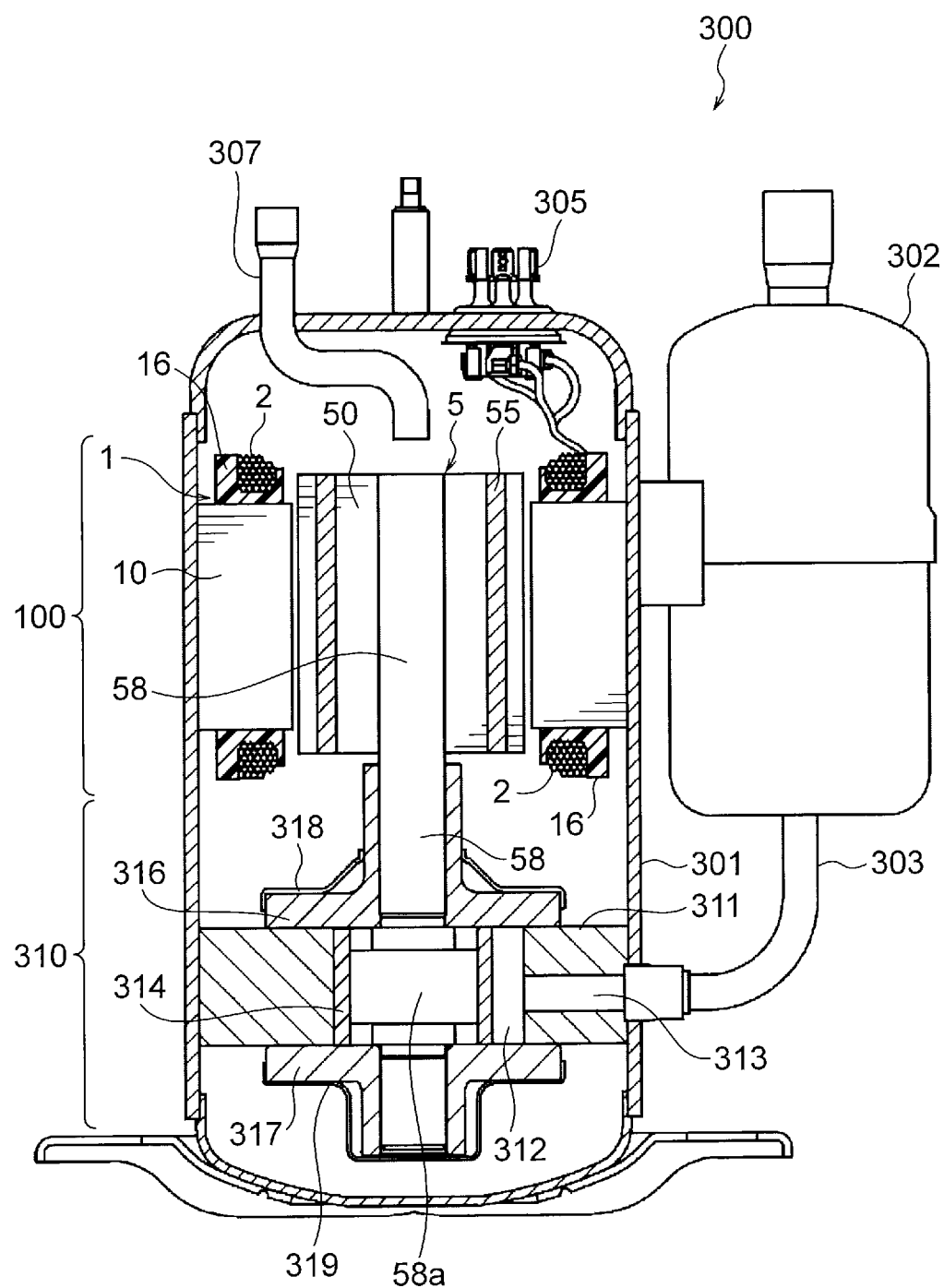
FIG. 26 is a diagram illustrating a compressor to which a motor according to each embodiment is applicable.

Next, a compressor 300 to which the motor of each embodiment described above is applicable will be described. FIG. 26 is a sectional view illustrating the compressor 300. The compressor 300 is a rotary compressor and includes a frame (closed container) 301, a compression mechanism 310 disposed in the frame 301, and the motor 100 that drives the compression mechanism 310.

The compression mechanism 310 includes a cylinder 311 having a cylinder chamber 312, a rolling piston 314 fixed to the shaft 58 of the motor 100, a vane (not shown) separating the inside of the cylinder chamber 312 into a suction side and a compression side, and an upper frame 316 and a lower frame 317 which close the end surfaces of the cylinder chamber 312 in the axial direction and through which the shaft 58 is inserted. An upper discharge muffler 318 and a lower discharge muffler 319 are mounted onto the upper frame 316 and the lower frame 317, respectively.

The frame 301 is a cylindrical container. At the bottom of the frame 301, refrigerant oil (not shown) for lubricating sliding portions of the compression mechanism 310 is stored. The shaft 58 is rotatably held by the upper frame 316 and the lower frame 317.

The cylinder 311 has the cylinder chamber 312 therein. The rolling piston 314 eccentrically rotates in the cylinder chamber 312. The shaft 58 has an eccentric shaft portion 58a onto which the rolling piston 314 is fitted.

The stator core 10 of the motor 100 is attached to the inside of the frame 301 by shrink-fitting. The coils 2 wound on the stator core 10 are supplied with power from a glass terminal 305 fixed to the frame 301. The shaft 58 is fixed to the shaft hole 57 (FIG. 1) of the rotor 5.

An accumulator 302 that stores a refrigerant gas is attached to the outer side of the frame 301. A suction pipe 303 is fixed to the frame 301, and the refrigerant gas is supplied from the accumulator 302 to the cylinder 311 via the suction pipe 303. A discharge pipe 307 through which the refrigerant is discharged to the outside is provided in an upper portion of the frame 301.

The operation of the compressor 300 is as follows. The refrigerant gas supplied from the accumulator 302 is supplied through the suction pipe 303 into the cylinder chamber 312 of the cylinder 311. When the motor 100 is driven and the rotor 5 rotates, the shaft 58 rotates with the rotor 5. Then, the rolling piston 314 fitted to the shaft 58 eccentrically rotates inside the cylinder chamber 312, thereby compressing the refrigerant in the cylinder chamber 312. The compressed refrigerant passes through the discharge mufflers 318 and 319, flows upward inside the frame 301 through holes (not shown) provided in the motor 100, and is discharged through the discharge pipe 307.

Figure 27:
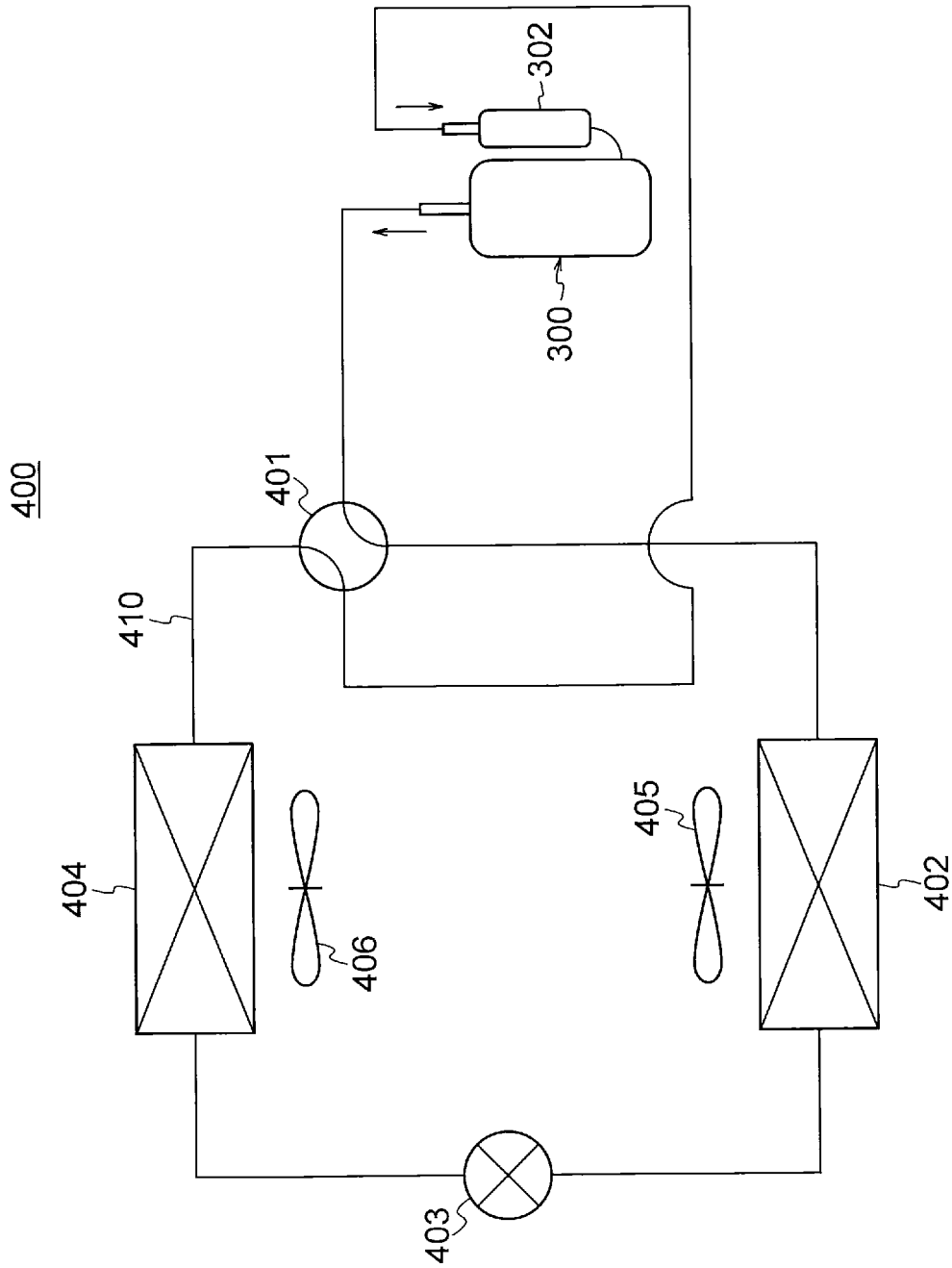
FIG. 27 is a diagram illustrating an air conditioner that includes the compressor illustrated in FIG. 26.

The compressor 300 is supplied with a mixture of a low-pressure refrigerant gas and a liquid refrigerant from a refrigerant circuit of the air conditioner 400 (FIG. 27). If the liquid refrigerant flows into and is compressed in the compression mechanism 310, it may cause the failure of the compression mechanism 310. Thus, the accumulator 302 separates the refrigerant into the liquid refrigerant and the refrigerant gas and supplies only the refrigerant gas to the compression mechanism 310.

The motor 100 described in each of the above-described embodiments is applicable to a drive source of the compressor 300. Thus, the manufacturing cost of the compressor 300 can be reduced, or the output of the compressor 300 can be improved.

(Air Conditioner)

Next, the air conditioner 400 including the compressor 300 illustrated in FIG. 26 will be described. FIG. 27 is a diagram illustrating the air conditioner 400. The air conditioner 400 illustrated in FIG. 27 includes the compressor 300, a four-way valve 401 as a switching valve, a condenser 402 to condense a refrigerant, a decompression device 403 to decompress the refrigerant, an evaporator 404 to evaporate the refrigerant, and a refrigerant pipe 410 connecting these components.

The compressor 300, the four-way valve 401, the condenser 402, the decompression device 403, and the evaporator 404 are connected together by the refrigerant pipe 410 to constitute a refrigerant circuit. The compressor 300 includes an outdoor fan 405 facing the condenser 402 and an indoor fan 406 facing the evaporator 404.

The operation of the air conditioner 400 is as follows. The compressor 300 compresses the sucked refrigerant and sends out the compressed refrigerant as a high-temperature and high-pressure refrigerant gas. The four-way valve 401 switches the flow direction of the refrigerant. During a cooling operation, the four-way valve 401 delivers the refrigerant sent out from the compressor 300, to the condenser 402 as illustrated in FIG. 27.

The condenser 402 exchanges heat between the refrigerant sent out from the compressor 300 and the outdoor air fed by the outdoor fan 405 to condense the refrigerant and then sends out the refrigerant as a liquid refrigerant. The decompression device 403 expands the liquid refrigerant sent out from the condenser 402 and then sends out the expanded refrigerant as a low-temperature and low-pressure liquid refrigerant.

The evaporator 404 exchanges heat between the indoor air and the low-temperature and low-pressure liquid refrigerant sent out from the decompression device 403 to evaporate (vaporize) the refrigerant and then sends out the refrigerant as the refrigerant gas. Thus, air from which the heat is removed in the evaporator 404 is supplied by the indoor fan 406 to the interior of a room, which is a space to be air-conditioned.

During a heating operation, the four-way valve 401 delivers the refrigerant sent out from the compressor 300, to the evaporator 404. In this case, the evaporator 404 functions as a condenser, while the condenser 402 functions as an evaporator.

The motor 100 described in each embodiment is applicable to the compressor 300 in the air conditioner 400. Thus, the manufacturing cost of the air conditioner 400 can be reduced, or the output of the air conditioner 400 can be improved.

Although the desirable embodiments of the present invention have been specifically described above, the present invention is not limited to the above-described embodiments, and various modifications and changes can be made to those embodiments without departing from the scope of the present invention.

What is claimed is:

1. A magnetization ring disposed between a rotor and a core portion surrounding the rotor, the rotor having a permanent magnet and an inter-pole portion which are arranged in a circumferential direction about an axis,
the magnetization ring comprising:
a magnetic portion facing a center of the permanent magnet in the circumferential direction;
a nonmagnetic portion facing the inter-pole portion; and
a nonmagnetic annular portion on at least one side of the magnetic portion and the nonmagnetic portion in a direction of the axis.

2. The magnetization ring according to claim 1, wherein the magnetic portion is one of a plurality of magnetic portions, and the nonmagnetic portion is one of a plurality of nonmagnetic portions, the magnetic portions and the nonmagnetic portion being arranged in the circumferential direction.

3. The magnetization ring according to claim 1, wherein the core portion has a slot in which a coil is housed, and
wherein a width of the nonmagnetic portion in the circumferential direction is wider than a width of the slot in the circumferential direction at an end closer to the rotor.

4. The magnetization ring according to claim 1, wherein the rotor has two slits on both sides of the inter-pole portion in the circumferential direction, and
wherein a width of the nonmagnetic portion in the circumferential direction is wider than a distance between the two slits.

5. The magnetization ring according to claim 1, wherein the core portion has a core back having an annular shape about an axis and a tooth extending from the core back toward the axis, and
wherein a width of the nonmagnetic portion in the circumferential direction is wider than a width of the tooth in the circumferential direction at an end closer to the rotor.

6. The magnetization ring according to claim 5, wherein the core portion has a slot adjacent to the tooth in the circumferential direction, and
wherein an end of the nonmagnetic portion in the circumferential direction reaches a center of the slot in the circumferential direction.

7. The magnetization ring according to claim 1, wherein a gap G between the rotor and the core portion and a thickness T of the magnetization ring in a radial direction about the axis satisfy $G \geq T > 0$.

8. The magnetization ring according to claim 1, wherein an outer diameter Dr of the rotor and an inner diameter Di of the magnetization ring satisfy $Dr \leq Di$.

9. The magnetization ring according to claim 1, wherein an inner diameter Ds of the core portion and an outer diameter Do of the magnetization ring satisfy $Ds \geq Do$.

10. The magnetization ring according to claim 1, wherein the magnetization ring has a film on at least one side thereof in a radial direction about the axis.

11. The magnetization ring according to claim 10, wherein the nonmagnetic portion is constituted by the film.

12. A magnetization method comprising:
disposing a magnetization ring between a rotor and a core portion surrounding the rotor, the rotor having a permanent magnet and an inter-pole portion which are arranged in a circumferential direction about an axis, and
magnetizing the permanent magnet by applying current to a coil wound on the core portion,
wherein the magnetization ring comprises a magnetic portion facing a center of the permanent magnet in the circumferential direction, a nonmagnetic portion facing the inter-pole portion, and a nonmagnetic annular portion provided on at least one side of the magnetic portion and the nonmagnetic portion in a direction of the axis.

13. The magnetization method according to claim 12, wherein, in the magnetization ring, the magnetic portion is one of a plurality of magnetic portions, and the nonmagnetic portion is one of a plurality of nonmagnetic portions, the magnetic portions and the nonmagnetic portion being arranged in the circumferential direction.

14. The magnetization method according to claim 12, wherein the core portion has a slot in which the coil is housed,
wherein in the step of magnetizing the permanent magnet, the inter-pole portion faces the slot of the core portion, and
wherein a width of the nonmagnetic portion in the circumferential direction is wider than a width of the slot in the circumferential direction at an end closer to the rotor.

15. The magnetization method according to claim 12, wherein the core portion has a slot in which the coil is housed, wherein in the step of magnetizing the permanent magnet, the inter-pole portion faces the slot of the core portion, wherein the rotor has two slits on both sides of the inter-pole portion in the circumferential direction, and wherein a width of the nonmagnetic portion in the circumferential direction is wider than a distance between the two slits.

16. The magnetization method according to claim 12, wherein the core portion has a core back having an annular shape about the axis and a tooth extending from the core back toward the axis, wherein in the step of magnetizing the permanent magnet, the inter-pole portion faces the tooth of the core portion, and wherein a width of the nonmagnetic portion in the circumferential direction is wider than a width of the tooth in the circumferential direction at an end closer to the rotor.

17. The magnetization method according to claim 16, wherein the core portion has a slot adjacent to the tooth in the circumferential direction, and wherein an end of the nonmagnetic portion in the circumferential direction reaches a center of the slot in the circumferential direction.

18. The magnetization method according to claim 12, wherein a gap G between the rotor and the core portion and a thickness T of the magnetization ring in a radial direction about the axis satisfy G≥T>0.

19. The magnetization method according to claim 12, wherein an outer diameter Dr of the rotor and an inner diameter Di of the magnetization ring satisfy Dr≤Di.

20. The magnetization method according to claim 12, wherein an inner diameter Ds of the core portion and an outer diameter Do of the magnetization ring satisfy Ds≥Do.

21. The magnetization method according to claim 12, wherein the magnetization ring has a film on at least one side thereof in a radial direction about the axis.

22. The magnetization method according to claim 21, wherein the nonmagnetic portion of the magnetization ring is constituted by the film.

23. The magnetization method according to claim 12, wherein the core portion is a stator of a motor.

24. The magnetization method according to claim 12, wherein the core portion is a magnetization yoke of a magnetization apparatus.

25. A rotor having a permanent magnet and an inter-pole portion which are arranged in a circumferential direction about an axis, wherein the rotor is magnetized by the magnetization method according to claim 12.

26. A motor comprising:
the rotor according to claim 25; and
a stator provided so as to surround the rotor.

27. A compressor comprising:
the motor according to claim 26;
a compression mechanism driven by the motor; and
a closed container that houses the motor and the compression mechanism.

28. An air conditioner comprising the compressor according to claim 27, a condenser, a decompression device, and an evaporator.

29. A magnetization apparatus to magnetize a permanent magnet of a rotor having the permanent magnet and an inter-pole portion which are arranged in a circumferential direction about an axis, the magnetization apparatus comprising:
a magnetization yoke on which a coil is wound, the magnetization yoke surrounding the rotor;
a magnetization ring disposed between the magnetization yoke and the rotor; and
a power source to apply current to the coil,
wherein the magnetization ring comprises a magnetic portion facing a center of the permanent magnet in the circumferential direction, a nonmagnetic portion facing the inter-pole portion, and a nonmagnetic annular portion provided on at least one side of the magnetic portion and the nonmagnetic portion in a direction of the axis.

30. The magnetization apparatus according to claim 29, wherein the magnetization ring is attached to a side of the magnetization yoke that faces the rotor.

31. The magnetization apparatus according to claim 29, wherein, in the magnetization ring, the magnetic portion is one of a plurality of magnetic portions, and the nonmagnetic portion is one of a plurality of nonmagnetic portions, the magnetic portions and the nonmagnetic portions being arranged in the circumferential direction.

32. The magnetization apparatus according to claim 29, wherein the magnetization yoke has a slot in which the coil is housed, wherein a width of the nonmagnetic portion in the circumferential direction is wider than a width of the slot in the circumferential direction at an end closer to the rotor, and wherein the permanent magnet is magnetized in a state where the slot of the magnetization yoke faces the inter-pole portion.

33. The magnetization apparatus according to claim 29, wherein the magnetization yoke has a slot in which the coil is housed, wherein the rotor has two slits on both sides of the inter-pole portion in the circumferential direction, wherein a width of the nonmagnetic portion in the circumferential direction is wider than a distance between the two slits, and wherein the permanent magnet is magnetized in a state where the slot of the magnetization yoke faces the inter-pole portion.

34. The magnetization apparatus according to claim 29, wherein a gap G between the rotor and the magnetization yoke and a thickness T of the magnetization ring in a radial direction about the axis satisfy G≥T>0.

35. The magnetization apparatus according to claim 29, wherein an outer diameter Dr of the rotor and an inner diameter Di of the magnetization ring satisfy Dr≤Di.

36. The magnetization apparatus according to claim 29, wherein an inner diameter Ds of the magnetization yoke and an outer diameter Do of the magnetization ring satisfy Ds≥Do.

37. The magnetization apparatus according to claim 29, wherein the magnetization ring has a film on at least one side thereof in a radial direction about the axis.

38. The magnetization apparatus according to claim 37, wherein the nonmagnetic portion of the magnetization ring is constituted by the film.

* * * * *